(12) United States Patent
Kim

(10) Patent No.: US 12,380,187 B2
(45) Date of Patent: Aug. 5, 2025

(54) ELECTRONIC DEVICE AND METHOD FOR ACQUIRING BIOMETRIC INFORMATION USING THE ELECTRONIC DEVICE

(71) Applicant: Samsung Electronics Co., Ltd., Suwon-si (KR)

(72) Inventor: Jinho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 619 days.

(21) Appl. No.: 17/531,037

(22) Filed: Nov. 19, 2021

(65) Prior Publication Data

US 2022/0179934 A1 Jun. 9, 2022

Related U.S. Application Data

(63) Continuation of application No. PCT/KR2021/016106, filed on Nov. 8, 2021.

(30) Foreign Application Priority Data

Dec. 9, 2020 (KR) .................... 10-2020-0171625

(51) Int. Cl.
*G06F 21/32* (2013.01)
*G06F 3/041* (2006.01)
(Continued)

(52) U.S. Cl.
CPC ............ *G06F 21/32* (2013.01); *G06F 3/0412* (2013.01); *G06F 3/04164* (2019.05);
(Continued)

(58) Field of Classification Search
None
See application file for complete search history.

(56) References Cited

U.S. PATENT DOCUMENTS 10,123,424 B1  11/2018  Lee et al.
10,139,938 B2  11/2018  Deng et al.
(Continued)

FOREIGN PATENT DOCUMENTS

KR        10-1849213 B1      4/2018
KR     10-2018-0110946 A    10/2018
(Continued)

OTHER PUBLICATIONS

International Search Report dated Mar. 3, 2022, issued in International Application No. PCT/KR2021/016106.

*Primary Examiner* — Lunyi Lao
*Assistant Examiner* — Sarvesh J Nadkarni
(74) *Attorney, Agent, or Firm* — Jefferson IP Law, LLP

(57) ABSTRACT

An electronic device is provided. The electronic device includes a display including a sensing area, a sensing layer below the display, the sensing layer including a plurality of openings, and a biometric sensor for receiving light emitted from the sensing area and reflected from an external object. The sensing layer includes first signal line sets, each including a plurality of first signal lines extending in a first direction, repeatedly arranged and spaced from each other by a specified spacing, and second signal line sets, each including a plurality of second signal lines extending in a second direction intersecting the first direction, repeatedly arranged and spaced from each other by a specified spacing. At least one of the first or second signal lines extends in and along a portion of the sensing layer between adjacent ones of the openings, which are positioned in a path along which light is reflected from the object and is then incident on the biometric sensor.

17 Claims, 19 Drawing Sheets

(51) Int. Cl.
  *G06F 3/042* (2006.01)
  *G06V 40/12* (2022.01)
  *G06V 40/13* (2022.01)
(52) U.S. Cl.
  CPC ........ *G06F 3/0421* (2013.01); *G06V 40/1318* (2022.01); *G06V 40/1365* (2022.01); *G06F 2218/00* (2023.01); *G06F 2218/12* (2023.01)

(56) References Cited

U.S. PATENT DOCUMENTS

| | | | |
|---|---|---|---|
| 10,349,523 | B2 | 7/2019 | Lee et al. |
| 10,488,693 | B2 | 11/2019 | Lee et al. |
| 10,684,650 | B2 | 6/2020 | Sim et al. |
| 10,747,042 | B2 | 8/2020 | Lee et al. |
| 10,809,861 | B2 | 10/2020 | Kim et al. |
| 11,175,786 | B2 | 11/2021 | Choi et al. |
| 11,178,320 | B2 | 11/2021 | Noh et al. |
| 11,373,433 | B2 * | 6/2022 | Tang ................ G06V 40/1318 |
| 11,375,052 | B2 | 6/2022 | Heo et al. |
| 11,442,587 | B2 | 9/2022 | Song et al. |
| 2015/0363629 | A1 | 12/2015 | Lee et al. |
| 2016/0224816 | A1* | 8/2016 | Smith ................... G02B 5/208 |
| 2017/0270342 | A1* | 9/2017 | He ....................... G06F 3/0418 |
| 2019/0156097 | A1* | 5/2019 | Liu ........................ H10K 59/65 |
| 2020/0004381 | A1* | 1/2020 | Han ....................... H10K 59/40 |
| 2020/0319682 | A1 | 10/2020 | Moon et al. |
| 2020/0379602 | A1* | 12/2020 | Zeng ................ G06V 40/1318 |
| 2020/0380237 | A1* | 12/2020 | Nilsson ............ G06V 40/1318 |
| 2021/0150174 | A1* | 5/2021 | Fu ...................... G06V 40/1306 |
| 2021/0334504 | A1* | 10/2021 | Lu ..................... H01L 27/14621 |
| 2021/0357079 | A1* | 11/2021 | Song ................. G06F 3/04164 |
| 2022/0043525 | A1* | 2/2022 | Lin ........................ H10K 59/65 |
| 2022/0067340 | A1* | 3/2022 | Han .................. G06V 40/1365 |
| 2022/0337687 | A1 | 10/2022 | Heo et al. |
| 2022/0350446 | A1 | 11/2022 | Song et al. |

FOREIGN PATENT DOCUMENTS

| | | | |
|---|---|---|---|
| KR | 10-2018-0130151 | A | 12/2018 |
| KR | 10-2019-0016630 | A | 2/2019 |
| KR | 10-2019-0112624 | A | 10/2019 |
| KR | 10-2019-0119366 | A | 10/2019 |
| KR | 10-2019-0120051 | A | 10/2019 |
| KR | 10-2020-0022981 | A | 3/2020 |
| KR | 10-2020-0042664 | A | 4/2020 |
| KR | 10-2020-0101039 | A | 8/2020 |
| KR | 10-2020-0117137 | A | 10/2020 |
| KR | 10-2020-0129570 | A | 11/2020 |

* cited by examiner

ELECTRONIC DEVICE AND METHOD FOR ACQUIRING BIOMETRIC INFORMATION USING THE ELECTRONIC DEVICE

CROSS-REFERENCE TO RELATED APPLICATION(S)

This application is a continuation application, claiming priority under § 365(c), of an International application No. PCT/KR2021/016106, filed on Nov. 8, 2021, which is based on and claims the benefit of a Korean patent application number 10-2020-0171625, filed on Dec. 9, 2020, in the Korean Intellectual Property Office, the disclosure of which is incorporated by reference herein in its entirety.

TECHNICAL FIELD

The disclosure relates to an electronic device and a method for acquiring biometric information using an electronic device.

BACKGROUND ART

Recently, various types of electronic devices have been developed and distributed. For example, spread of not only a desktop personal computer (PC), but also mobile devices having various functions such as a smart phone, a tablet PC, or a wearable device are expanding. Further, recent electronic devices include various types of sensors to perform various functions. For example, many recent electronic devices use biometric information (e.g., fingerprint information) of a user acquired through a biometric sensor, in relation to lock and unlock, security, and user authentication of the electronic device.

The above information is presented as background information only to assist with an understanding of the disclosure. No determination has been made, and no assertion is made, as to whether any of the above might be applicable as prior art with regard to the disclosure.

DISCLOSURE

Technical Purpose

In an electronic device including a sensing layer (e.g., digitizer) for detecting a position of a digital pen, the sensing layer may include an opening in an area corresponding to a biometric sensor so that light for acquiring biometric information may reach the biometric sensor. An area in which the biometric information is detected may be determined according to a size or number of openings of the sensing layer. However, when the opening of the sensing layer becomes excessively large, it may be difficult to accurately detect the position of the digital pen in an area where the opening is located. As the size of the opening of the sensing layer is limited in the electronic device, the biometric information detection area may be limited.

Aspects of the disclosure are to address at least the above-mentioned problems and/or disadvantages and to provide at least the advantages described below. Accordingly, an aspect of the disclosure is to provide an electronic device including a sensing layer and capable of detecting biometric information in a wide area.

Another aspect of the disclosure is to provide an electronic device which may detect biometric information in a large area, and thus may have enhanced security and increased user convenience.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a display comprising a sensing area, a sensing layer disposed below the display the sensing layer comprising a plurality of openings and configured to sense a touch input or a hovering input, and a biometric sensor configured to receive light emitted from the sensing area of the display and reflected from an external object. The sensing layer includes first signal line sets repeatedly arranged and spaced from each other by a specified spacing, and second signal line sets repeatedly arranged and spaced from each other by a specified spacing. Each of the first signal line sets includes a plurality of first signal lines extending in a first direction, and each of the second signal line sets includes a plurality of second signal lines extending in a second direction intersecting the first direction. At least one of the plurality of first signal lines or the plurality of second signal lines extends in and along a portion of the sensing layer between adjacent ones of the plurality of openings. The plurality of openings of the sensing layer are disposed in a path along which light is reflected from the object and is then incident on the biometric sensor.

In accordance with another aspect of the disclosure, a method for acquiring biometric information using an electronic device is provided. The method includes emitting light from a sensing area of a display toward an external object, acquiring raw image information on a plurality of areas of the object, based on light reflected from the object and passing through a plurality of openings of a sensing layer located under the display, and incident on a biometric sensor, and correcting individual portions of the raw image information respectively corresponding to the plurality of areas of the object, and acquiring a fingerprint image based on the corrected individual portions.

Advantageous Effects

According to embodiments, the electronic device may include the sensing layer and detect the biometric information in a wide area.

Further, according to embodiments, the electronic device may detect the biometric information in a large area, and thus may have enhanced security and increased user convenience.

In addition to the above effects, various effects identified directly or indirectly based on the disclosure may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
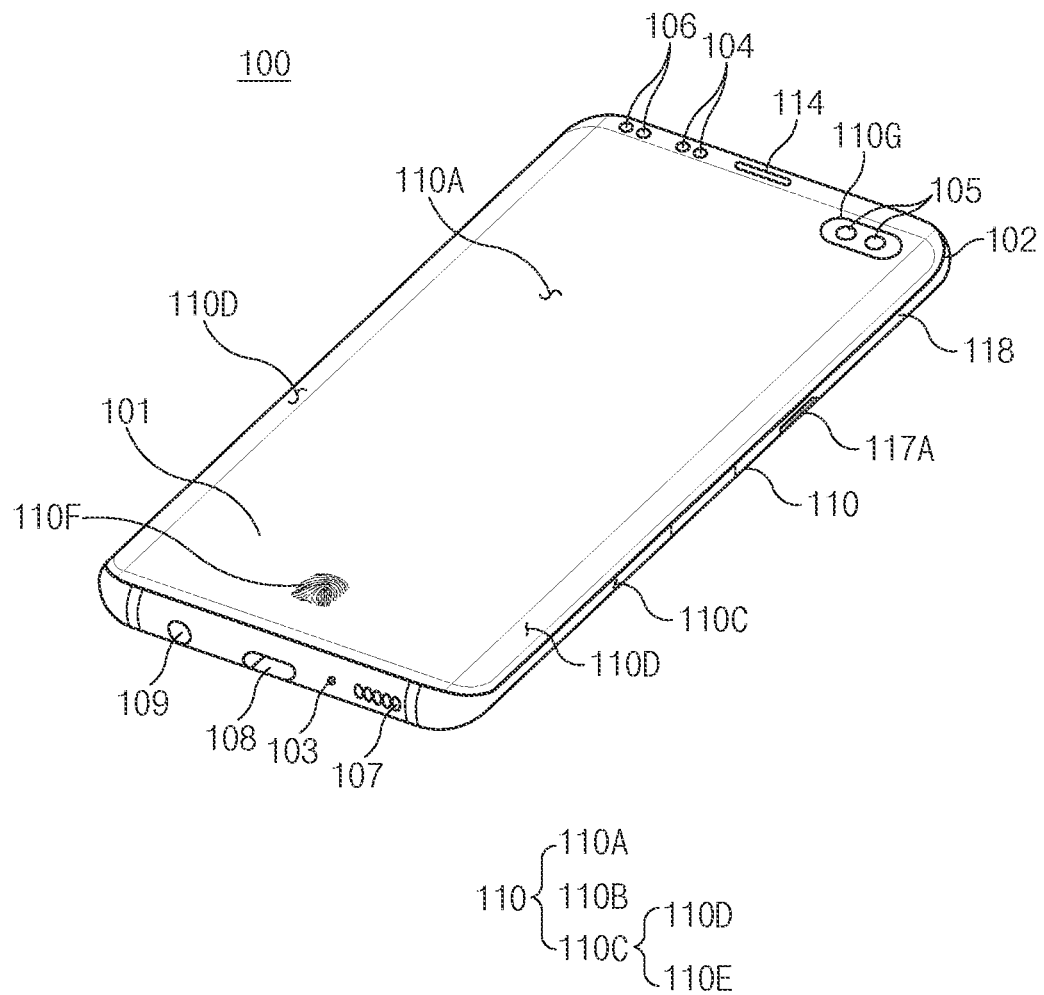
FIG. 1 is a front perspective view of an electronic device according to an embodiment of the disclosure.

FIG. 1 is a front perspective view of an electronic device according to an embodiment of the disclosure.

Figure 2:
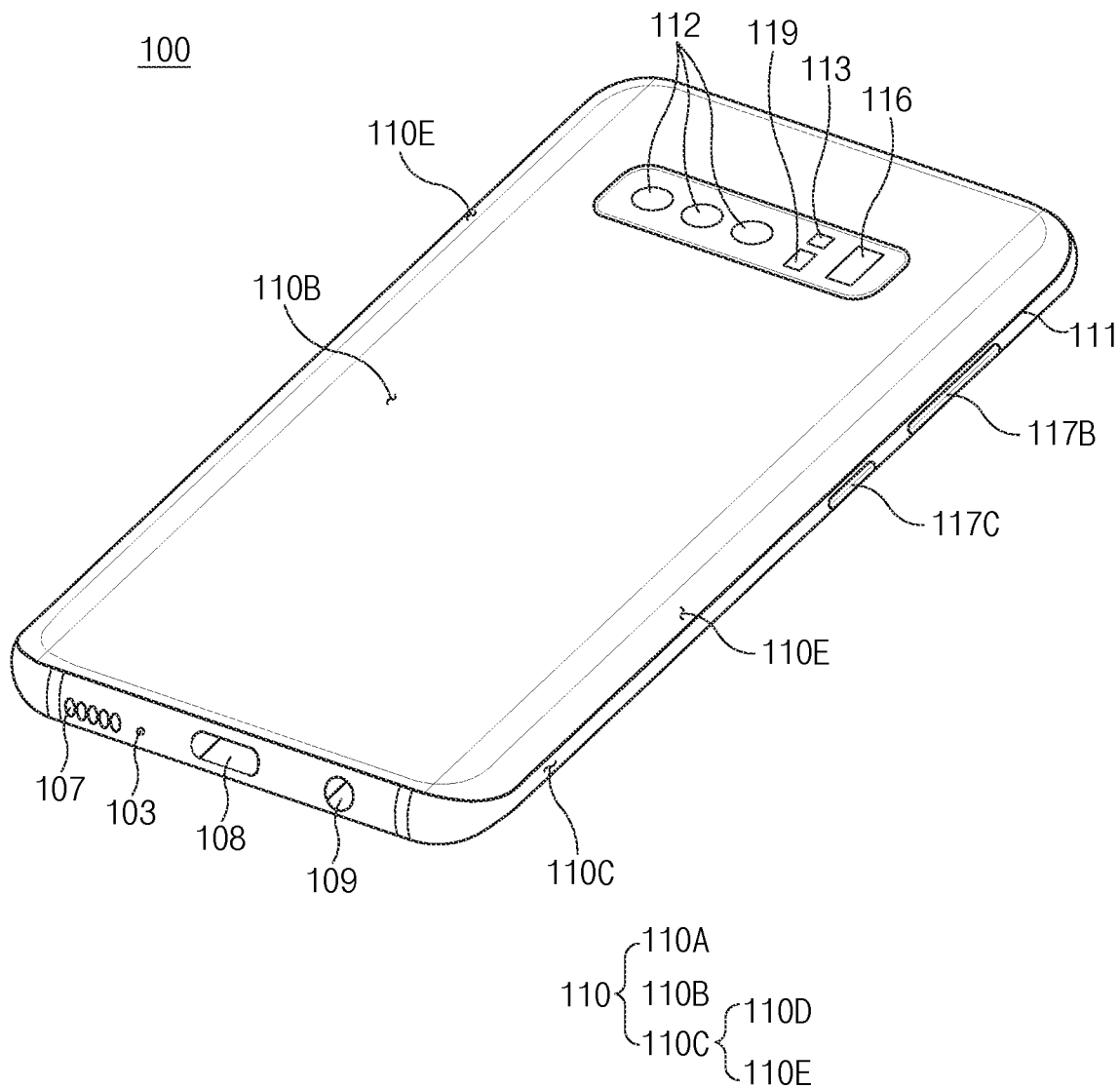
FIG. 2 is a rear perspective view of the electronic device shown in FIG. 1 according to an embodiment of the disclosure.

FIG. 2 is a rear perspective view of the electronic device shown in FIG. 1 according to an embodiment of the disclosure.

Referring to FIGS. 1 and 2, an electronic device 100 according to one embodiment may include a housing 110 including a first face (screen display area, front face) 110A, a second face (or rear face 110B), and a side face 110C surrounding a space between the first face 110A and the second face 110B. In another embodiment (not shown), the housing 110 may refer to a structure constituting at least one of the first face 110A, the second face 110B, and the side face 110C of FIG. 1.

According to one embodiment, the first face 110A may be embodied as at least portion of a substantially transparent front plate 102 (e.g., a glass plate including various coating layers, or a polymer plate). The second face 110B may be embodied as a substantially opaque rear plate 111. The rear plate 111 may be made of, for example, a coated or colored glass, ceramic, polymer, metal (e.g., aluminum, stainless steel (STS), or magnesium, or a combination of at least two thereof). The side face 110C may be coupled to the front plate 102 and the rear plate 111 and may be embodied as a side bezel structure (or "side member") 118 including metal and/or polymer. In some embodiments, the rear plate 111 and the side bezel structure 118 are integrally formed with each other and may include the same material (e.g., a metal material such as aluminum).

In the illustrated embodiment, the front plate 102 may include two first areas 110D curved from the first face 110A toward the rear plate 111 and extending seamlessly, at both ends of a long edge of the front plate 102, respectively.

In the illustrated embodiment of FIG. 2, the rear plate 111 may include two second areas 110E curved from the second face 110B toward the front plate 102 and extending seamlessly, at both ends of a long edge of the rear plate 111, respectively.

In some embodiments, the front plate 102 (or the rear plate 111) may include only one of the first areas 110D (or the second areas 110E). In another embodiment, the front plate 102 (or the rear plate 111) may not include one of the first areas 110D (or the second areas 110E).

In the embodiments, in a side view of the electronic device 100, the side bezel structure 118 may have a first thickness (or width) at a side (e.g., a short side) free of the first area 110D or the second area 110E, and may have a second thickness smaller than the first thickness, at a side (e.g., a long side) having the first area 110D or the second area 110E.

According to one embodiment, the electronic device 100 may include at least one of a display 101, audio module (including microphone hole 103, speaker holes 107, and call receiver hole 114), sensor modules 104, 116, and 119, camera modules 105 and 112, flash 113, key input devices 117A, 117B, and 117C, a light-emitting element 106, and connector holes 108 and 109. In some embodiments, the electronic device 100 may be free of at least one (e.g., the key input devices 117A, 117B, and 117C or the light-emitting element 106) of the components or additionally include another component.

The display 101 may be exposed, for example, through a substantial portion of the front plate 102. In some embodiments, at least a portion of the display 101 may be exposed through the front plate 102 including the first face 110A and the first area 110D of the side face 110C.

In some embodiments, an edge of the display 101 may have substantially the same shape as a shape of an edge of the front plate 102 adjacent thereto. In another embodiment (not shown), in order to extend an area through which the display 101 is exposed, a spacing between the edge of the display 101 and the edge of the front plate 102 may be substantially constant.

In one embodiment, a surface of the housing 110 (or the front plate 102) may include a screen display area created as the display 101 is visually exposed. In an example, the screen display area may include the first face 110A and the first area 110D of the side face.

In the illustrated embodiment, the screen display areas 110A and 110D may include a sensing area 110F configured to acquire user's biometric information. In this connection, "the screen display areas 110A and 110D including the sensing area 110F" may mean that at least portion of the sensing area 110F may overlap the screen display areas 110A and 110D. In other words, the sensing area 110F may mean an area that may display visual information from the display 101 as other areas of the screen display areas 110A and 110D may do and may additionally acquire the user's biometric information (e.g., fingerprint information).

In the illustrated embodiment, the screen display areas 110A and 110D of the display 101 may include an area 110G where the first camera device 105 (e.g., a punch hole camera) may be visually exposed. At least portion of an edge of the area 110G in which the first camera device 105 is visually exposed may be surrounded with the screen display areas 110A and 110D. In various embodiments, the first camera device 105 may include a plurality of camera devices.

In another embodiment (not shown), a recess or opening may be formed in a portion of the screen display areas 110A and 110D of the display 101. At least one of the audio module, the first sensor module 104, and the light-emitting element 106 may be aligned with the recess or the opening.

In another embodiment (not shown), the display 101 may include, on a rear face of the screen display areas 110A and 110D, at least one of the audio module, the sensor modules 104, 116, and 119, and the light-emitting element 106.

In another embodiment (not shown), the display 101 may be disposed adjacent to or coupled to a touch sensing circuit, a pressure sensor capable of measuring an intensity (pressure) of a touch, and/or a sensing layer that detects a stylus pen operating in a magnetic field scheme.

In some embodiments, at least some of the sensor modules 104, 116, and 119, and/or at least some of the key input devices 117A, 117B, and 117C may be disposed on the side face 110C (e.g., the first areas 110D and/or the second areas 110E).

The audio module may include the microphone hole 103, the speaker holes 107, and the call receiver hole 114. A microphone for acquiring external sound may be disposed in the microphone hole 103. In some embodiments, a plurality of microphones may be disposed therein to sense a direction of the sound. The speaker and call receiver holes 107 and 114 may include the external speaker hole 107 and the call receiver hole 114. In some embodiments, the speaker and call receiver holes 107 and 114 and the microphone hole 103 may be implemented as one hole. Alternatively, the speaker and call receiver holes 107 and 114 may be absent and a speaker may be included (e.g., a piezo speaker).

The sensor modules 104, 116, and 119 may create an electrical signal or data value corresponding to an internal operating state of the electronic device 100 or an external environmental state. For example, the sensor modules 104, 116, and 119 may include the first sensor module 104 (e.g., a proximity sensor) disposed on the first face 110A of the housing 110, the second sensor module 116 (e.g., a TOF camera device) disposed on the second face 110B of the housing 110, the third sensor module 119 (e.g., a HRM sensor) disposed on the second face 110B of the housing 110, and/or a fourth sensor module (e.g., a sensor module 190 in FIG. 3) (e.g., a fingerprint sensor) coupled to the display 101.

In various embodiments, the second sensor module 116 may include a TOF camera device for distance measurement.

In various embodiments, at least portion of the fourth sensor module (e.g., the sensor module 190 in FIG. 3) may be disposed in the screen display areas 110A and 110D. For example, the fourth sensor module may be disposed on a rear face of the display 101. That is, the fourth sensor module (e.g., the sensor module 190 of FIG. 3) may not be exposed to the screen display areas 110A and 110D, and may constitute the sensing area 110F in the at least portion of the screen display areas 110A and 110D.

In some embodiments (not shown), the sensing area 110F may be disposed on the first face 110A (e.g., the screen display areas 110A and 110D) of the housing 110 as well as the second face 110B thereof.

In various embodiments, the electronic device 100 may further include a sensor module (not shown), at least one of, for example, a gesture sensor, a gyro sensor, a barometric pressure sensor, a magnetic sensor, an acceleration sensor, a grip sensor, a color sensor, an IR infrared sensor, a biometric sensor, a temperature sensor, a humidity sensor, or an illumination sensor.

The camera modules 105 and 112 and flash 113 may include the first camera device 105 (e.g., a punch hole camera device) exposed to the first face 110A of the electronic device 100, the second camera device 112 exposed to the second face 110B, and/or the flash 113.

In the illustrated embodiment, the first camera device 105 may be exposed through a portion of the screen display area 110D of the first face 110A. For example, the first camera device 105 may be exposed to a partial area of the screen display area 110D through an opening (not shown) formed in a portion of the display 101.

In the illustrated embodiment, the second camera device 112 may include a plurality of camera devices (e.g., a dual camera, a triple camera). However, the second camera device 112 may not be necessarily limited to including the plurality of camera devices, and may include one camera device.

Each of the camera devices 105 and 112 may include one or a plurality of lenses and image sensors, and/or an image signal processor. The flash 113 may include, for example, a light-emitting diode or a xenon lamp. In some embodiments, two or more lenses (infrared camera, wide angle and telephoto lens) and image sensors may be disposed on one face of the electronic device 100.

The key input devices 117A, 117B, and 117C may be disposed on the side face 110C of the housing 110. In another embodiment, the electronic device 100 may not include some or all of the mentioned key input devices 117A, 117B, and 117C. The key input devices 117A, 117B, and 117C that are not included therein may be implemented using a key input device of a different type such as a soft key on the display 101. In some embodiments, the key input device may include a sensor module (e.g., the sensor module 190 in FIG. 3) constituting the sensing area 110F included in the screen display areas 110A and 110D.

The light-emitting element 106 may be disposed, for example, on the first face 110A of the housing 110. The light-emitting element 106 may provide, for example, state information of the electronic device 100 in a form of light. In another embodiment, the light-emitting element 106 may provide, for example, a light source that is associated with an operation of the first camera device 105. The light-emitting element 106 may include, for example, a light emitting diode (LED), an infrared (IR) LED, and a xenon lamp.

The connector holes 108 and 109 may include the first connector hole 108 that may accommodate therein a connector (e.g., a universal serial bus (USB) connector) for transmitting and receiving power and/or data to and from an external electronic device, and/or the second connector hole 109 that may accommodate therein a connector (e.g., an earphone jack) for transmitting and receiving an audio signal to and from the external electronic device.

Figure 3:
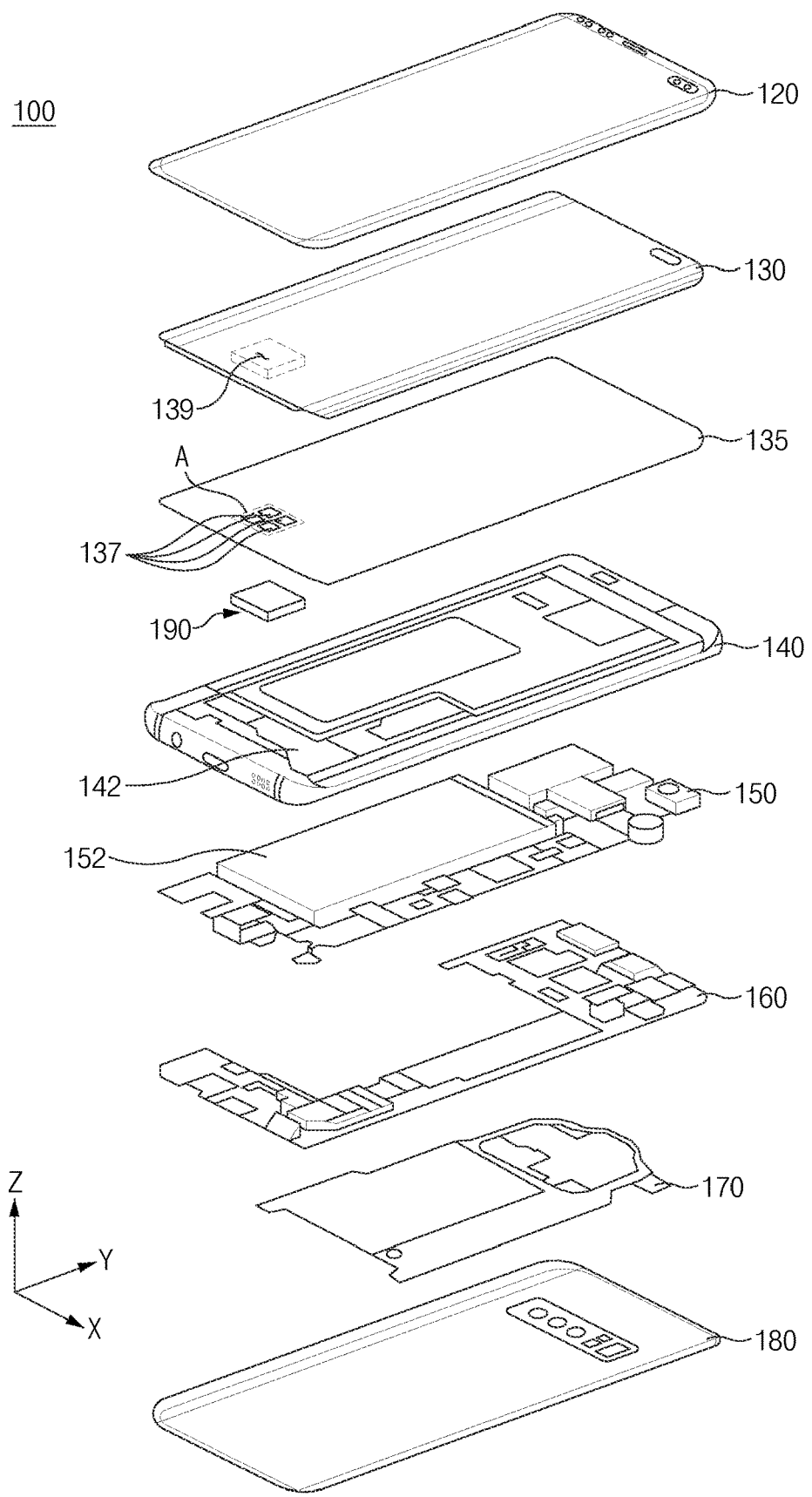
FIG. 3 is an exploded perspective view of the electronic device shown in FIG. 1 according to an embodiment of the disclosure.

FIG. 3 is an exploded perspective view of the electronic device shown in FIG. 1 according to an embodiment of the disclosure.

Referring to FIG. 3, the electronic device 100 may include a side member 140, a first support member 142 (e.g., a bracket), a front plate 120, a display 130 (e.g., the display 101 in FIG. 1), a sensing layer 135 (e.g., digitizer), a printed circuit board 150, a battery 152, a second support member 160 (e.g., a rear casing), an antenna 170, a rear plate 180 and the sensor module 190. In some embodiments, the electronic device 100 may be free of at least one (e.g., the first support member 142, or the second support member 160) of the components or additionally include another component. At least one of the components of the electronic device 100 may be the same as or similar to at least one of the components of the electronic device 100 of FIG. 1 or FIG. 2, and redundant descriptions thereof will be omitted below.

The display 130 may be located under the front plate 120 and may include a sensing area 139 (e.g., the sensing area 110F of FIG. 1). At least some components (e.g., an embossed layer) of the display 130 may include an opening in the sensing area 139.

The sensing layer 135 may include a plurality of signal lines and may detect a digital pen (e.g., a stylus pen) operating in a magnetic field scheme. The sensing layer 135 may sense a touch input or a hovering input of the digital pen using the plurality of signal lines, and may detect a position of the digital pen. The sensing layer 135 may be attached to a rear face of the display 130. Alternatively, the sensing layer 135 may be contained in the display 130. The sensing layer 135 may include a plurality of openings 137 (e.g., a plurality of openings 510 in FIG. 5) in an area corresponding to the sensing area 139 of the display 130. The plurality of openings 137 may be disposed in the sensing layer 135 and along a path of light reflected from an external object and incident to the sensor module 190. The plurality of openings 137 of the sensing layer 135 may be aligned with the sensing area 139 of the display 130 and the sensor module 190 in one direction. Among the plurality of signal lines of the sensing layer 135, signal lines which may extend so as to overlap the plurality of openings 137 may extend to bypass the plurality of openings 137. The electronic device 100 may correct a signal acquired via the signal lines bypassing the plurality of openings 137 to acquire information on the position of the digital pen in the area corresponding to the plurality of openings 137. When a distance between the signal lines bypassing the plurality of openings 137 is greater than a specified distance, accuracy of position detection of the digital pen via the correction may be reduced. Accordingly, a size of each of the plurality of openings 137 may be limited based on a spacing range between the signal lines in which the position of the digital pen may be detected through the correction. The first support member 142 may be disposed inside the electronic device 100 and connected to the side member 140, or may be integrally formed with the side member 140. The first support member 142 may be made of, for example, a metal material and/or a non-metal (e.g., polymer material). The first support member 142 may be coupled, at one face thereof, to the display 130 and, at an opposite face thereof, to the printed circuit board 150. The printed circuit board 150 may have a processor, a memory, and/or an interface mounted thereon. The processor may include, for example, at least one of a central processing unit, an application processor, a graphics processing unit, an image signal processor, a sensor hub processor, or a communication processor.

The memory may include, for example, a volatile memory or a non-volatile memory.

The interface may include, for example, a HDMI (high definition multimedia interface), an USB interface, a secure digital (SD) card interface, and/or an audio interface. The interface may, for example, electrically or physically connect the electronic device 100 to an external electronic device, and may include a USB connector, an SD card/multimedia card (MMC) connector, or an audio connector.

The battery 152 may act to supply power to at least one component of the electronic device 100, and may include, for example, a non-rechargeable primary battery, a rechargeable secondary battery, or a fuel cell. In one example, at least a portion of the battery 152 may be substantially coplanar with the printed circuit board 150. The battery 152 may be disposed inside and integral with the electronic device 100 or may be disposed inside and detachable from the electronic device 100.

The antenna 170 may be disposed between the rear plate 180 and the battery 152. The antenna 170 may include, for example, a near field communication (NFC) antenna, a wireless charging antenna, and/or a magnetic secure transmission (MST) antenna. In one example, the antenna 170 may communicate with an external device over a short range, or wirelessly transmit and receive power required for charging to and from an external device. In another embodiment, an antenna structure may be composed of a portion of the side member 140 and/or the first support member 142 or a combination thereof.

The sensor module 190 may be located below the display 130 and the sensing layer 135. The sensor module 190 may overlap at least a portion of the sensing area 139 of the display 130. The sensor module 190 may collect light reflected from an external object (e.g., a finger) and may sense the collected light. The sensor module 190 may acquire biometric information (e.g., fingerprint information) based on a detecting result of the collected light. The light reflected from the object may pass through the display 130 and the sensing layer 135 and reach the sensor module 190.

The sensing layer 135 may include a material having low light transmittance, and may be opaque. Most of the light reflected from the object may not pass through the sensing layer 135. For example, light transmittance of the sensing layer 135 may be smaller than 1%. The sensing layer 135 may include the plurality of openings 137 along a path of light reflected from the object and incident to the sensor module 190. In this case, the light reflected from the object may pass through the plurality of openings 137 of the sensing layer 135 and be incident on the sensor module 190. Because a size of one opening formed in the sensing layer 135 is limited to a size within a certain range due to the signal lines of the sensing layer 135, the sensing layer 135 of the electronic device 100 according to one embodiment may include the plurality of openings 137 to widen the biometric information detection area. The sensor module 190 may overlap at least some of the plurality of openings 137 of the sensing layer 135.

Figure 4:
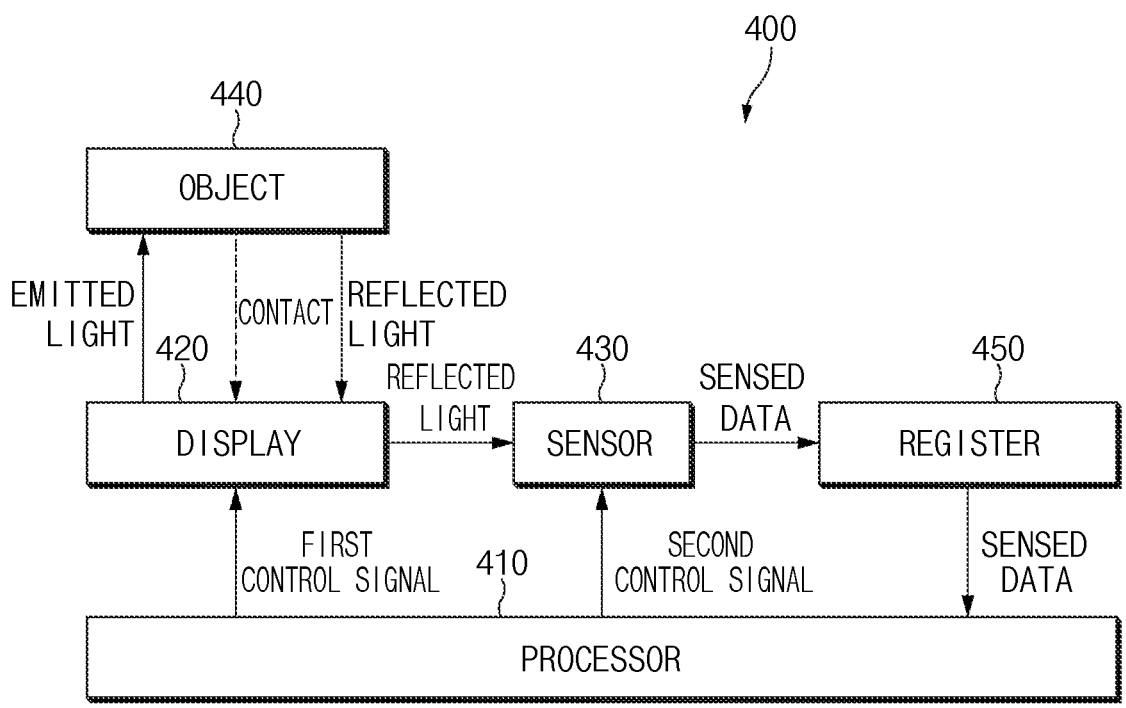
FIG. 4 is a block diagram showing an electronic device for acquiring biometric information according to an embodiment of the disclosure.

FIG. 4 is a block diagram 400 showing an electronic device (e.g., the electronic device 100 of FIG. 1) for acquiring biometric information according to an embodiment of the disclosure.

Figure 19:
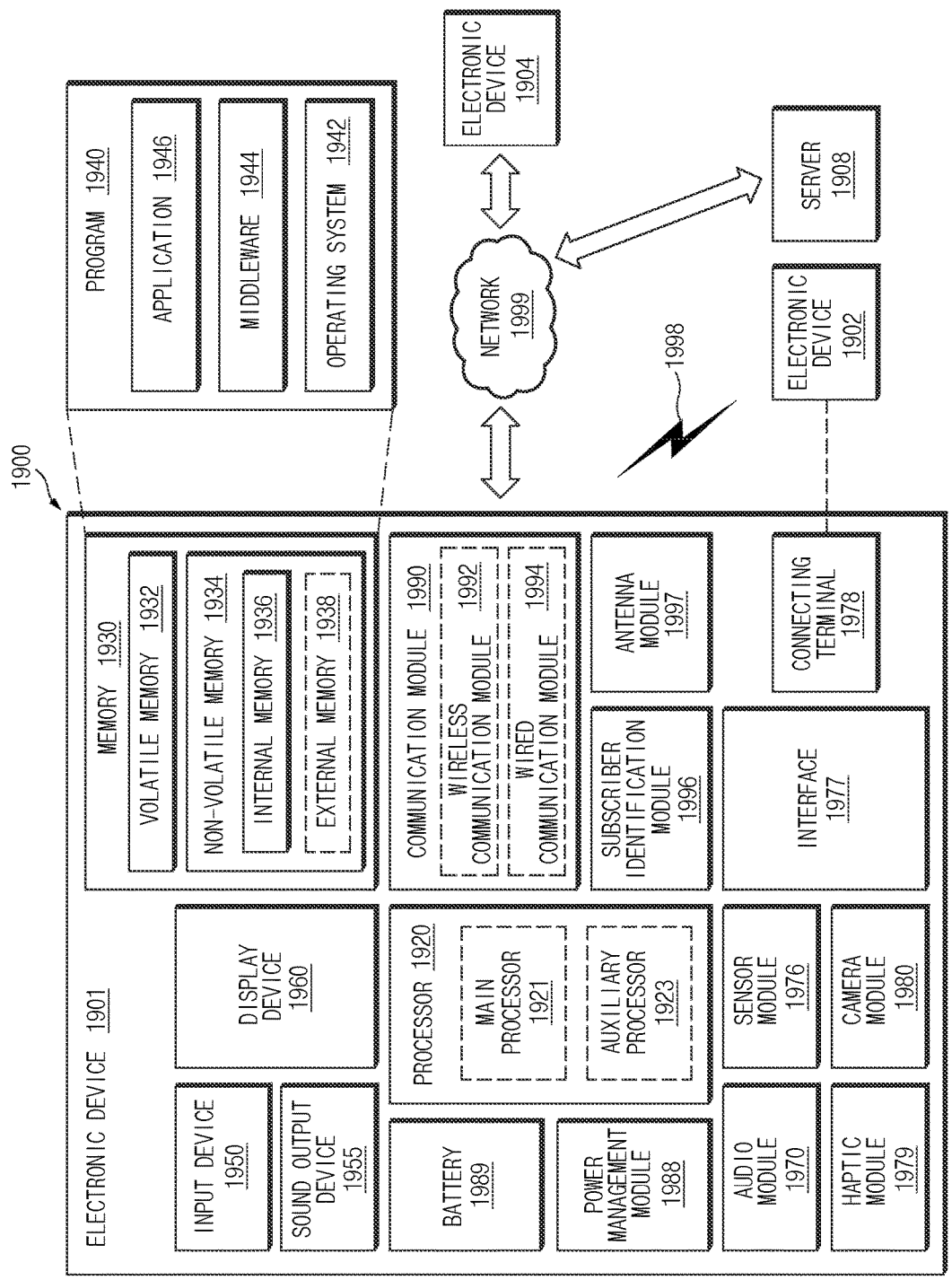
FIG. 19 is a block diagram of an electronic device in a network environment, according to an embodiment of the disclosure.

Referring to FIG. 4, the electronic device 100 according to one embodiment may include a processor 410 (e.g., a processor 1920 in FIG. 19), a display 420 (e.g., the display 101 in FIG. 1, the display 130 in FIG. 3 or a display module (or device) 1960 in FIG. 19), a sensor 430 (e.g., the sensor module 190 of FIG. 3 or a sensor module 1976 of FIG. 19), a register 450 (e.g., a memory 1930 of FIG. 19).

In one embodiment, the processor 410 may be operatively coupled to the display 420, the sensor 430, and the register 450. The processor 410 may provide a first control signal to the display 420. The first control signal may set a position at which at least one light source such as a pixel disposed in the display 420 emits light, an amount of the light as emitted, and/or a timing at which the light source emits the light. The processor 410 may provide a second control signal to the sensor 430. The second control signal may set a timing at which the sensor 430 is activated. For example, the processor 410 may be configured to synchronize an operation timing of the light source and an operation timing of the specified sensor 430 with each other.

In one embodiment, the display 420 may display an image. The display 420 may emit light to display an image. The display 420 may include at least one light source (e.g., a pixel) for emitting light. At least one light source may be arranged in an array structure and in the display 420.

In one embodiment, the sensor 430 may be disposed on one face of the display 420 or below the display 420. The sensor 430 may collect the light reflected from an external object 440 (e.g., a finger) to the display 420 and sense the collected light. For example, the sensor 430 may include a light-collecting element such as a lens and a light-receiving element such as a photo diode. For example, the sensor 430 may include the light-collecting element (e.g., a lens) and an image sensor that creates a fingerprint image.

In one embodiment, the register 450 may record an amount of the reflected light as sensed when a specified light source is turned on. The processor 410 may acquire a value related to the amount of the reflected light stored in the register 450. The processor 410 may reconstruct biometric information related to the object 440. For example, when the object 440 is a finger of the user, the processor 410 may reconstruct the fingerprint image based on the amount of the reflected light received from the register 450.

In one embodiment, the processor 410 may transmit the first control signal to the display 420 in response to contact between the object 440 and the display 420 and thus set light to be output from the display 420 based on the first control signal. The processor 410 may set a position at which the display 420 emits the light, an intensity thereof, a pattern thereof, and/or a timing at which the display emits the light. For example, when the object 440 is a finger of the user, and as soon as fingerprint measurement starts, the processor 410 may set a measurement range of a fingerprint based on fingerprint information or contact information (e.g., a contact position, a contact area, and a contact strength) from the touch sensor disposed on the display 420. The processor 410 may transmit the first control signal for operating at least one light source corresponding to the measurement range to the display 420.

In one embodiment, the processor 410 may provide the second control signal to the sensor 430 in response to the contact between the object 440 and the display 420. For example, when the sensor 430 is arranged in a form of at least one array, the processor 410 may supply the second control signal to the sensor 430 disposed in an area on the display 420 in contact with the object 440, on one face of the display 420, or below the display 420 to activate the sensor 430.

In one embodiment, the processor 410 may activate the sensor 430 disposed in an area corresponding to an area at which the display 420 emits light, on one face of the display 420, or below the display 420. The processor 410 may activate the sensor 430 while the display 420 is emitting the light, and thus sense the light reflected from the object 440 using the sensor. For example, the processor 410 may activate at least one sensor 430 disposed at a position overlapping an area at which the display 420 emits the light in a thickness direction (e.g., a z-axis direction in FIG. 3) of the display 420. In another example, the processor 410 may activate a plurality of sensors 430 disposed at a position overlapping an area at which the display 420 emits the light in the thickness direction of the display 420 and disposed in an area around the position.

In one embodiment, the sensor 430 may create sensed data based on the sensed reflected light. For example, the sensor 430 may create the sensed data based on a ratio of an amount of light reflected from the object 440 relative to an amount of the light emitted from the display 420. The sensed data may be stored in the register 450. The register 450 may transmit the sensed data to the processor 410.

In one embodiment, the processor 410 may be configured to control the display 210 to emit light until an entirety of an area corresponding to a biometric information measurement range is scanned. When the measurement of the area corresponding to the biometric information measurement range has been completed, the processor 410 may create an image related to the biometric information in the biometric information measurement range, based on the stored sensed data. For example, the processor 410 may create a shape of the user's fingerprint in a fingerprint sensing area as an image.

Figure 5:
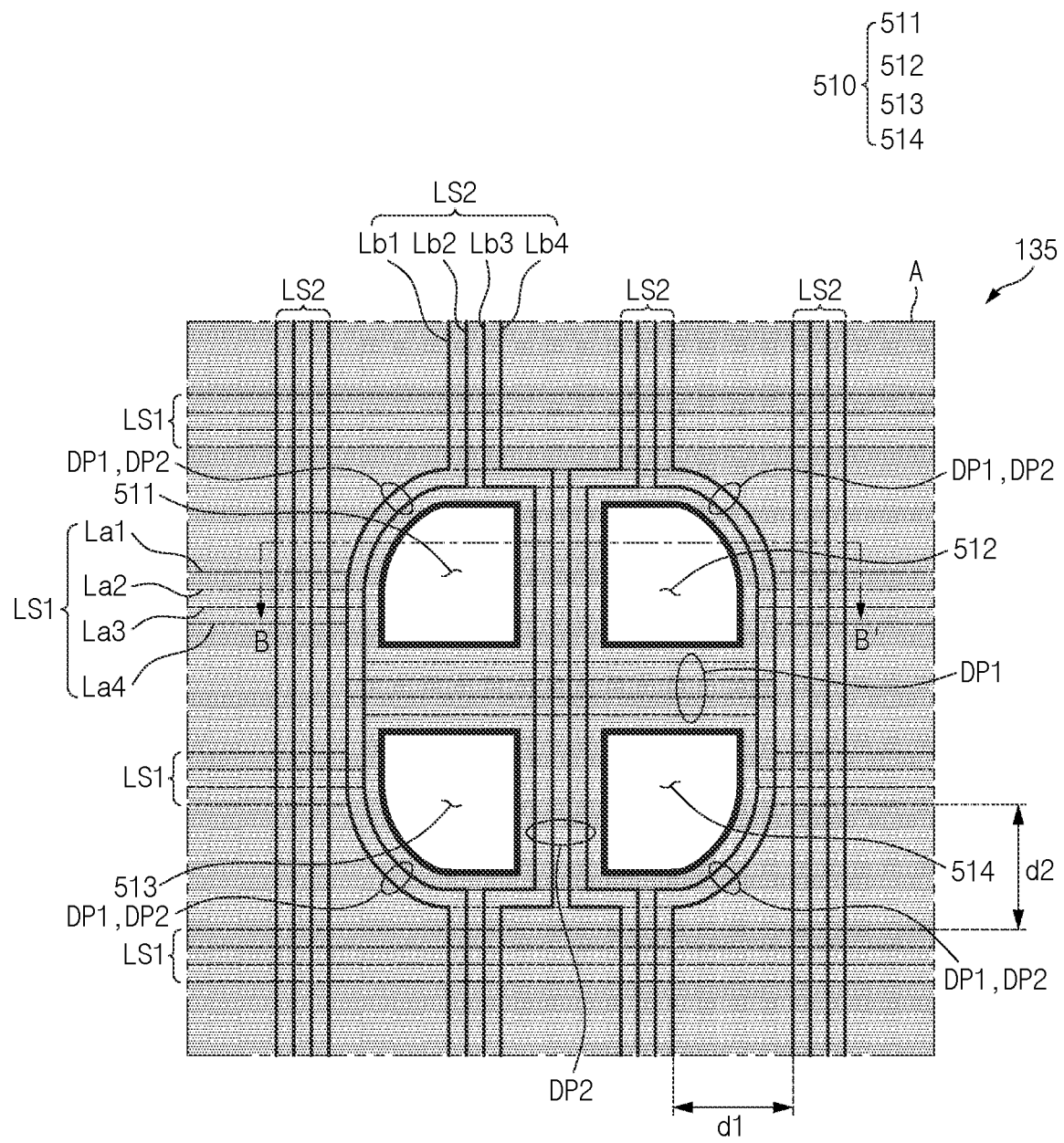
FIG. 5 is a plan view showing an area A of a sensing layer shown in FIG. 3 according to an embodiment of the disclosure.

FIG. 5 is a plan view showing an area A of the sensing layer 135 shown in FIG. 3 according to an embodiment of the disclosure.

Referring to FIG. 5, the sensing layer 135 included in the electronic device (e.g., the electronic device 100 in FIG. 1) according to one embodiment may include the plurality of openings 510, first signal line sets LS1 and second signal line sets LS2.

The plurality of openings 510 may include a first opening 511, a second opening 512, a third opening 513, and a fourth opening 514. At least some of the plurality of openings 510 may overlap the sensor module (e.g., the sensor module 190 in FIG. 3) in the third direction (z-axis direction). At least some of the plurality of openings 510 may overlap a sensing area (e.g., the sensing area 139 in FIG. 3) of the display in the third direction (e.g., the z-axis direction). The plurality of openings 510 may be arranged in a grid manner. For example, the first opening 511 and the second opening 512 may be arranged and side by side substantially in the first direction (e.g., the x-axis direction). The third opening 513 and the fourth opening 514 may be arranged and side by side substantially in the first direction (e.g., the x-axis direction). The first opening 511 and the third opening 513 may be arranged and side by side substantially in the second direction (e.g., the y-axis direction). The second opening 512 and the fourth opening 514 may be arranged and side by side substantially in the second direction (e.g., the y-axis direction). However, the number and arrangement of the plurality of openings 510 are not limited to those shown in FIG. 5.

The first signal line set LS1 may include a plurality of first signal lines La1, La2, La3, and La4 extending in the first direction (e.g., the x-axis direction). Groups of the plurality of first signal lines La1, La2, La3 and La4 may be repeatedly arranged in the second direction (e.g., the y-axis direction). For example, a spacing between adjacent ones of the four first signal lines La1, La2, La3, and La4 may be about 300 μm, and a width of the first signal line set LS1 including the four first signal lines La1, La2, La3 and La4 may be about 1 mm. The disclosure is not limited to the above-described example. The first signal lines La1, La2, La3, and La4 may transmit a signal for detecting the position of the digital pen. The first signal line sets LS1, each including the first signal lines La1, La2, La3, and La4, may be repeatedly arranged in the second direction (e.g., the y-axis direction).

A spacing between adjacent first signal line sets LS1 may be a first distance d2. For example, the first distance d2 may be about 4 mm, but may not be limited thereto. When the plurality of openings 510 are located in a path along which the first signal lines La1, La2, La3 and La4 extend, each of the first signal lines La1, La2, La3 and La4 may include a plurality of first bypassing portions DP1 bypassing the opening 510 and extending along an edge of the opening 510. The first bypassing portions DP1 of each of the first signal lines La1, La2, La3, and La4 may be curved along the edges of the plurality of openings 510, respectively.

The second signal line set LS2 may include a plurality of second signal lines Lb1, Lb2, Lb3, and Lb4 extending in the second direction (e.g., the y-axis direction). Groups of the plurality of second signal lines Lb1, Lb2, Lb3, and Lb4 may be repeatedly arranged in the first direction (e.g., the x-axis direction). For example, a spacing between adjacent ones of the four second signal lines Lb1, Lb2, Lb3, and Lb4 may be about 300 μm, and a width of the second signal line set LS2 including the four second signal lines Lb1, Lb2, Lb3 and Lb4 may be about 1 mm. The disclosure is not limited to the above-described example. The second signal lines Lb1, Lb2, Lb3, and Lb4 may transmit a signal for detecting the position of the digital pen. The second signal line sets LS2, each including the second signal lines Lb1, Lb2, Lb3, and Lb4, may be repeatedly arranged in the first direction (e.g., the x-axis direction).

The sensing layer 135 may generate a magnetic field using the plurality of first signal lines La1, La2, La3 and La4 and a plurality of second signal lines Lb1, Lb2, Lb3 and Lb4 extending in a direction intersecting each other, and may detect the position of the digital pen based on a sensing result of magnetic field change due to proximity of the digital pen thereto. For example, the sensing layer 135 may detect x and y coordinates of the digital pen using the first signal line set LS1 extending in the first direction (e.g., the x-axis direction) and the second signal line set LS2 extending in the second direction (e.g., the y-axis direction). A spacing between adjacent second signal line sets LS2 may be a second distance d1. For example, the second distance d1 may be about 4 mm, but may not be limited thereto. When the plurality of openings 510 are located in a path in which the second signal lines Lb1, Lb2, Lb3, and Lb4 extend, each of the second signal lines Lb1, Lb2, Lb3, and Lb4 may include second bypassing portions DP2 bypassing the plurality of openings 510 and respectively extending along the edges of the plurality of openings 510. The second bypassing portions DP2 of each of the second signal lines Lb1, Lb2, Lb3, and Lb4 may be respectively curved along the edges of the plurality of openings 510.

At least one of the first signal lines La1, La2, La3 and La4 or the second signal lines Lb1, Lb2, Lb3, and Lb4 may be positioned between the plurality of openings 510. For example, the second bypassing portion DP2 of at least one of the second signal lines Lb1, Lb2, Lb3, and Lb4 may be located between the first opening 511 and the second opening 512. The second bypassing portion DP2 of at least one of the second signal lines Lb1, Lb2, Lb3, and Lb4 may be positioned between the third opening 513 and the fourth opening 514. The first bypassing portion DP1 of at least one of the first signal lines La1, La2, La3, and La4 may be located between the first opening 511 and the third opening 513. The first bypassing portion DP1 of at least one of the first signal lines La1, La2, La3, and La4 may be located between the second opening 512 and the fourth opening 514. The electronic device according to one embodiment may correct a signal detected using the first bypassing portion DP1 or the second bypassing portion DP2 bypassing the plurality of openings 510 and thus displaced from a non-bypassed state, and thus acquire information about an exact position of the digital pen in the area corresponding to the plurality of openings 510 based on the corrected signal.

For the correction of the detected position of the digital pen, each of lengths in the first direction (e.g., the x-axis direction) of the first opening 511, the second opening 512, the third opening 513 and the fourth opening 514 may be smaller than or equal to (2*second distance d1). For example, each of the lengths in the first direction (e.g., the x-axis direction) of the first opening 511, the second opening 512, the third opening 513, and the fourth opening 514 may be smaller than or equal to about 8 mm. For the correction of the detected position of the digital pen, each of the lengths in the second direction (e.g., the y-axis direction) of the first opening 511, the second opening 512, the third opening 513 and the fourth opening 514 may be smaller than or equal to (2*first distance d2). For example, each of the lengths in the second direction (e.g., the y-axis direction) of the first opening 511, the second opening 512, the third opening 513, and the fourth opening 514 may be smaller than or equal to about 8 mm According to one embodiment, the length in the first direction (e.g., the x-axis direction) of each of the plurality of openings 510 may be smaller than or equal to (2*second distance d1), and the length in the second direction (e.g., the y-axis direction) thereof may be smaller than or equal to (2*the first distance d2). Thus, the detected position of the digital pen in the area where the plurality of openings 510 are located may be corrected such that the exact position of the digital pen may be detected. The sensing layer 135 of the electronic device according to one embodiment may include the plurality of openings 510 of a specified size to allow the biometric information detection area to be wider. The first opening 511 and the second opening 512 may be surrounded with the first bypassing portions DP1 of one first signal line set LS1. The first opening 511 and the second opening 512 may be surrounded with one first signal line set LS1 and may be located between both opposing first signal line sets LS1 adjacent thereto. The third opening 513 and the fourth opening 514 may be surrounded with the first bypassing portions DP1 of one first signal line set LS1. The third opening 513 and the fourth opening 514 may be surrounded with one first signal line set LS1 and may be located between both opposing first signal line sets LS1 adjacent thereto. The first opening 511 and the third opening 513 may be surrounded with the second bypassing portions DP2 of one second signal line set LS2. The first opening 511 and the third opening 513 may be surrounded with one second signal line set LS2 and be located between both opposing second signal line sets LS2 adjacent thereto. The second opening 512 and the fourth opening 514 may be surrounded with the second bypassing portions DP2 of one second signal line set LS2. The second opening 512 and the fourth opening 514 may be surrounded with one second signal line set LS2 and be located between both opposing second signal line sets LS2 adjacent thereto.

Figure 6:
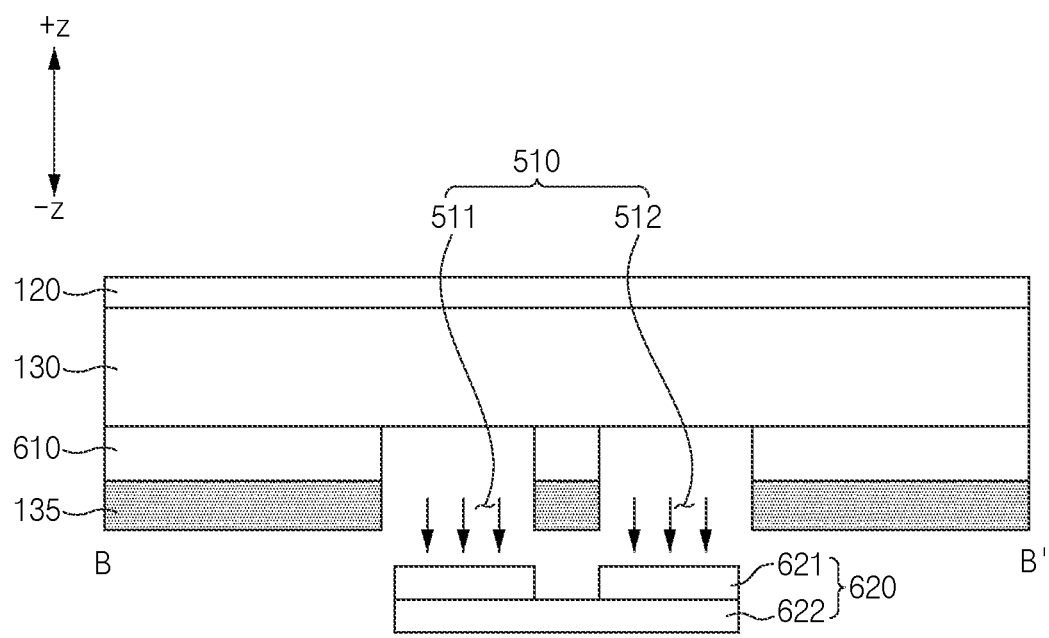
FIG. 6 is a cross-sectional view cut along a line B-B' of FIG. 5 in an electronic device according to an embodiment of the disclosure.

FIG. 6 is a cross-sectional view cut along a line B-B' of FIG. 5 in the electronic device according to an embodiment of the disclosure.

Referring to FIG. 6, the electronic device (e.g., the electronic device 100 in FIG. 1 or an electronic device 1901 in FIG. 19) according to one embodiment include the front plate 120, the display 130 (e.g., the display 101 in FIG. 1), an embossed layer 610, a sensing layer 135 and a sensor module 620 (e.g., the sensor module 190 in FIG. 3 or the sensor module 1976 in FIG. 19).

The display 130 may be located under the front plate 120 (e.g., in an −z-axis direction). The embossed layer 610 and the sensing layer 135 may be positioned under the display 130 (e.g., in the −z-axis direction). The embossed layer 610 may include a material for absorbing shock applied to the front plate 120 or the display 130. The embossed layer 610 may include openings in an area corresponding to positions of the first opening 511 and the second opening 512 of the sensing layer 135.

The sensor module 620 may include an optical member 621 and a biometric sensor 622. The light emitted from the display 130 is reflected from an object (e.g., a finger) positioned on the front plate 120, passes through the plurality of openings 510 of the sensing layer 135, and is incident on the sensor module 620. The optical member 621 may collect the light that has passed through the optical member 621. For example, the optical member 621 may include a lens, a micro lens, a pinhole array, or a collimator. The biometric sensor 622 may be disposed under the optical member 621 to create sensed data using the light passing through the optical member 621. For example, the biometric sensor 622 may include an image sensor.

Figure 7:
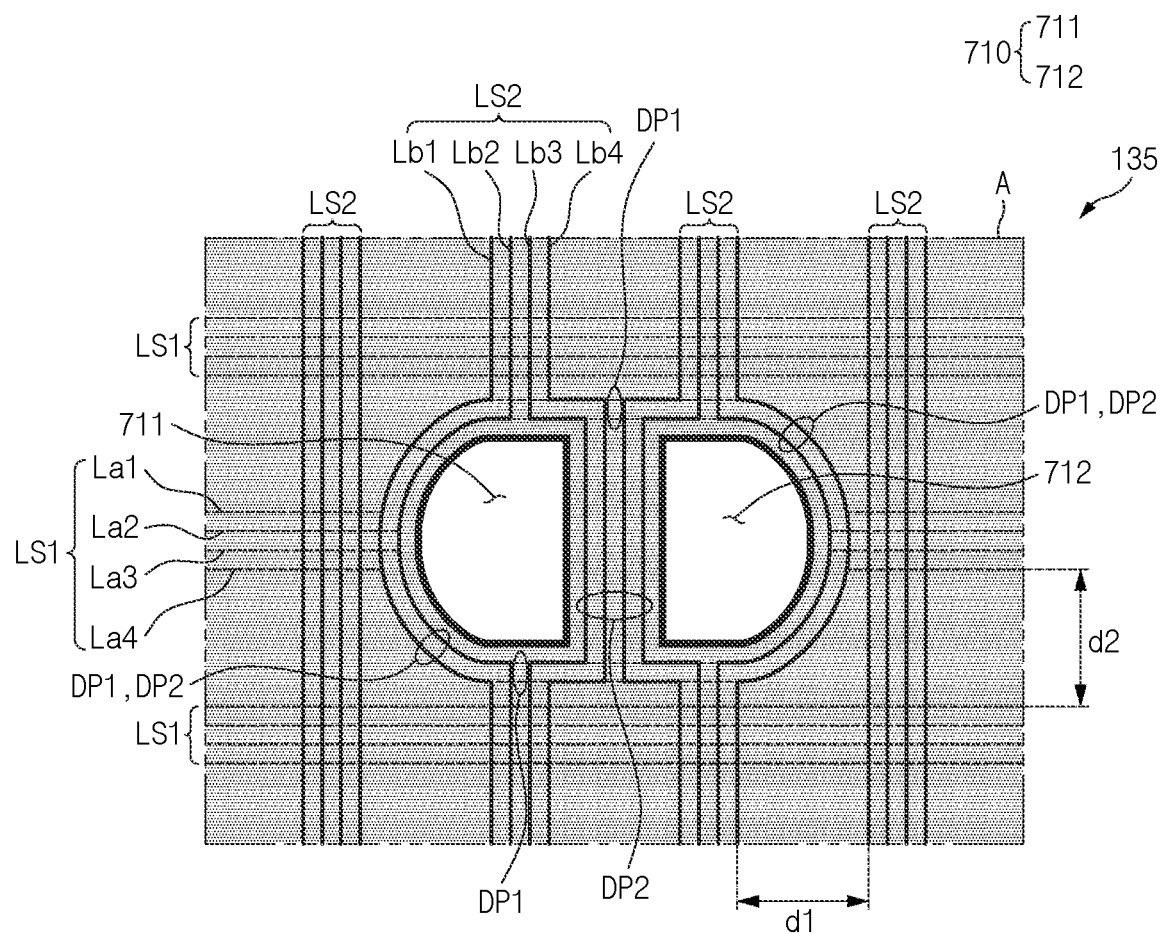
FIG. 7 is a plan view showing one area of a sensing layer included in an electronic device according to an embodiment of the disclosure.

FIG. 7 is a plan view showing one area (e.g., the A area in FIG. 3) of the sensing layer 135 included in the electronic device according to an embodiment of the disclosure.

Referring to FIG. 7, the sensing layer 135 included in the electronic device (e.g., the electronic device 100 in FIG. 1 or the electronic device 1901 in FIG. 19) according to one embodiment may include a plurality of openings 710, first signal line sets LS1, and second signal line sets LS2.

The plurality of openings 710 may include a first opening 711 and a second opening 712. At least some of the plurality of openings 710 may overlap the sensor module (e.g., the sensor module 190 in FIG. 3) along the third direction (e.g., the z-axis direction). At least some of the plurality of openings 710 may overlap the sensing area (e.g., the sensing area 139 in FIG. 3) of the display in the third direction (e.g., the z-axis direction). The first opening 711 and the second opening 712 may be arranged side by side substantially in the first direction (e.g., the x-axis direction). However, the number and arrangement of the plurality of openings 710 are not limited to those shown in FIG. 7.

The first signal line set LS1 may include a plurality of first signal lines La1, La2, La3 and La4 extending in the first direction (e.g., the x-axis direction). A spacing between adjacent first signal line sets LS1 may be a first distance d2. When the plurality of openings 710 are located in a path in which the first signal lines La1, La2, La3, and La4 extend, each of the first signal lines La1, La2, La3 and La4 may include first bypassing portions DP1 bypassing the plurality of openings 710 and respectively extending along the edges of the plurality of openings 710.

The second signal line set LS2 may include a plurality of second signal lines Lb1, Lb2, Lb3, and Lb4 extending in the second direction (e.g., the y-axis direction). A spacing between adjacent second signal line sets LS2 may be a second distance d1. When the plurality of openings 710 are positioned in a path in which the second signal lines Lb1, Lb2, Lb3, and Lb4 extend, each of the second signal lines Lb1, Lb2, Lb3, and Lb4 may include second bypassing portions DP2 bypassing the plurality of openings 710 and respectively extending along the edges of the plurality of openings 710.

At least one second signal line Lb1, Lb2, Lb3, and Lb4 may be positioned between the plurality of openings 710. For example, at least one of the second signal lines Lb1, Lb2, Lb3, and Lb4 may be positioned between the first opening 711 and the second opening 712. Each of the lengths in the first direction (e.g., the x-axis direction) of the first opening 711 and the second opening 712 may be smaller than or equal to (2*second distance d1). For example, each of the lengths in the first direction (e.g., the x-axis direction) of the first opening 711 and the second opening 712 may be smaller than or equal to about 8 mm Each of the lengths in the second direction (e.g., the y-axis direction) of the first opening 711 and the second opening 712 may be smaller than or equal to (2*first distance d2). For example, each of the lengths in the second direction (e.g., the y-axis direction) of the first opening 711 and the second opening 712 may be smaller than or equal to about 8 mm. When the length in the first direction (e.g., the x-axis direction) of each of the plurality of openings 710 is greater than (2*second distance d1), or the length in the second direction (e.g., the y-axis direction) thereof is greater than (2*first distance d2), the exact position of the digital pen may not detected even when the signal acquired using the first bypassing portion DP1 or the second bypassing portion DP2 bypassing the first opening 711 and the second opening 712 is corrected.

The first opening 711 and the second opening 712 may be surrounded with the first bypassing portions DP1 of one first signal line set LS1. The first opening 711 and the second opening 712 may be surrounded with one first signal line set LS1 and may be located between both opposing first signal line sets LS1 adjacent thereto. The first opening 711 may be surrounded with the second bypassing portion DP2 of one second signal line set LS2. The first opening 711 may be surrounded with one second signal line set LS2 and may be located between both opposing second signal line sets LS2 adjacent thereto. The second opening 712 may be surrounded with the second bypassing portions DP2 of one second signal line set LS2. The second opening 712 may be surrounded with one second signal line set LS2 and may be located between both opposing second signal line sets LS2 adjacent thereto.

Figure 8:
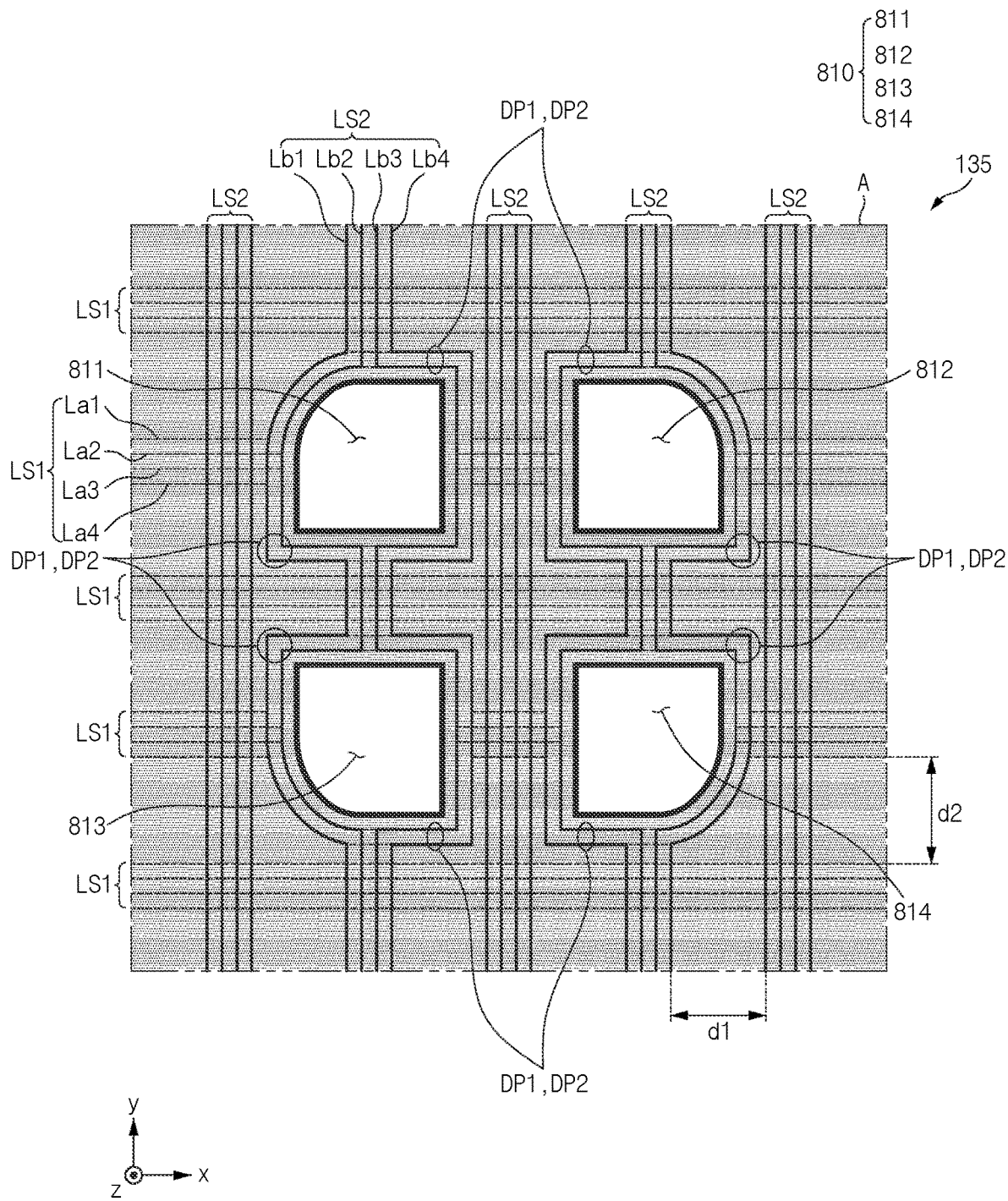
FIG. 8 is a plan view showing one area of a sensing layer included in an electronic device according to an embodiment of the disclosure.

FIG. 8 is a plan view showing one area (e.g., the area A in FIG. 3) of the sensing layer 135 included in the electronic device according to an embodiment of the disclosure.

Referring to FIG. 8, the sensing layer 135 included in the electronic device (e.g., the electronic device 100 in FIG. 1 or the electronic device 1901 in FIG. 19) according to one embodiment may include a plurality of openings 810, first signal line sets LS1, and second signal line sets LS2.

The plurality of openings 810 may include a first opening 811, a second opening 812, a third opening 813, and a fourth opening 814. At least some of the plurality of openings 810 may overlap the sensor module (e.g., sensor module 190 in FIG. 3) along the third direction (e.g., the z-axis direction). At least some of the plurality of openings 810 may overlap the sensing area (e.g., the sensing area 139 in FIG. 3) of the display in the third direction (e.g., the z-axis direction). The plurality of openings 810 may be arranged in a grid manner. However, the number and arrangement of the plurality of openings 810 are not limited to those shown in FIG. 8.

The first signal line set LS1 may include a plurality of first signal lines La1, La2, La3, and La4 extending in the first direction (e.g., the x-axis direction). A spacing between adjacent first signal line sets LS1 may be a first distance d2. When the plurality of openings 810 are located in a path in which the first signal lines La1, La2, La3 and La4 extend, each of the first signal lines La1, La2, La3 and La4 may include first bypassing portion DP1s bypassing the plurality of openings 810 and respectively extending along the edges of the plurality of openings 810.

The second signal line set LS2 may include a plurality of second signal lines Lb1, Lb2, Lb3, and Lb4 extending in the second direction (e.g., the y-axis direction). A spacing between adjacent second signal line sets LS2 may be a second distance d1. When the plurality of openings 810 are located in a path in which the second signal lines Lb1, Lb2, Lb3 and Lb4 extend, each of the second signal lines Lb1, Lb2, Lb3 and Lb4 may include second bypassing portions DP2 bypassing the plurality of openings 810 and respectively extending along the edges of the plurality of openings 810.

The first signal line set LS1 extending in the first direction (e.g., the x-axis direction) and a first bypassing portion DP1 of at least one first signal line La1, La2, La3 and La4 included in another first signal line set LS1 adjacent thereto may be located between the first opening 811 and the third opening 813 or between the second opening 812 and the fourth opening 814. The second signal line set LS2 extending in the second direction (e.g., the y-axis direction) and a second bypassing portion DP2 of at least one second signal line Lb1, Lb2, Lb3 and Lb4 included in another second signal line set LS2 thereto may be located between the first opening 811 and the second opening 812 or between the third opening 813 and the fourth opening 814.

The first opening 811 and the second opening 812 may be surrounded with the first bypassing portions DP1 of one first signal line set LS1. The first opening 811 and the second opening 812 may be surrounded with one first signal line set LS1 surrounding the first opening 811 and the second opening 812 and may be located between both opposing first signal line sets LS1 adjacent thereto. The third opening 813 and the fourth opening 814 may be surrounded with the first bypassing portion DP1 of one first signal line set LS1. The third opening 813 and the fourth opening 814 may be surrounded with one first signal line set LS1 surrounding the third opening 813 and the fourth opening 814 and may be located between both opposing first signal line sets LS1 adjacent thereto. The first opening 811 and the third opening 813 may be surrounded with the second bypassing portions DP2 of one second signal line set LS2. The first opening 811 and the third opening 813 may be surrounded with one second signal line set LS2 surrounding the first opening 811 and the third opening 813 and may be located between both opposing second signal line sets LS2 adjacent thereto. The second opening 812 and the fourth opening 814 may be surrounded with second bypassing portions DP2 of one second signal line set LS2. The second opening 812 and the fourth opening 814 may be surrounded with one second signal line set LS2 surrounding the second opening 812 and the fourth opening 814 and may be located between both opposing second signal line sets LS2 adjacent thereto.

Figure 9:
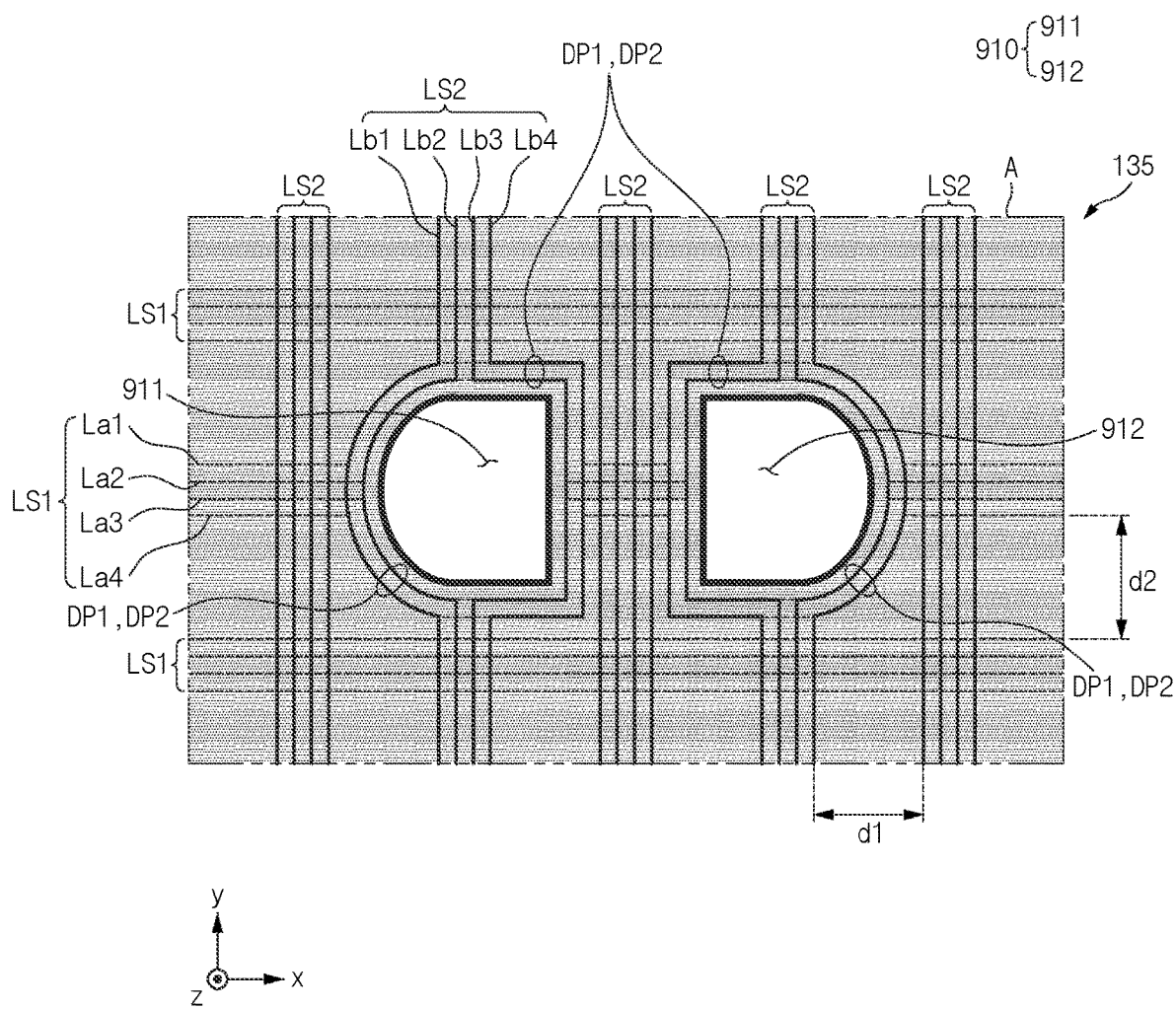
FIG. 9 is a plan view showing one area of a sensing layer included in an electronic device according to an embodiment of the disclosure.

FIG. 9 is a plan view showing one area (e.g., the A area in FIG. 3) of the sensing layer 135 included in the electronic device according to an embodiment of the disclosure.

Referring to FIG. 9, the sensing layer 135 included in the electronic device (e.g., the electronic device 100 in FIG. 1 or the electronic device 1901 in FIG. 19) according to one embodiment may include a plurality of openings 910, first signal line sets LS1, and second signal line sets LS2.

The plurality of openings 910 may include a first opening 911 and a second opening 912 that are arranged in the first direction (e.g., the x-axis direction). However, the number and arrangement of the plurality of openings 910 are not limited to those shown in FIG. 9.

The first signal line set LS1 may include a plurality of first signal lines La1, La2, La3 and La4 extending in the first direction (e.g., the x-axis direction). A spacing between adjacent first signal line sets LS1 may be a first distance d2. When the plurality of openings 910 are located in a path in which the first signal lines La1, La2, La3 and La4 extend, each of the first signal lines La1, La2, La3 and La4 may include first bypassing portions DP1 bypassing the plurality of openings 910 and respectively extending along the edges of the plurality of openings 910.

The second signal line set LS2 may include a plurality of second signal lines Lb1, Lb2, Lb3, and Lb4 extending in the second direction (e.g., the y-axis direction). A spacing between adjacent second signal line sets LS2 may be a second distance d1. When the plurality of openings 910 are located in a path in which the second signal lines Lb1, Lb2, Lb3, and Lb4 extend, each of the second signal lines Lb1, Lb2, Lb3 and Lb4 may include second bypassing portions DP2 bypassing the plurality of openings 910 and respectively extending along the edges of the plurality of openings 910.

A second signal line set LS2 extending in the second direction (e.g., the y-axis direction) and a second bypassing portion DP2 of at least one second signal line Lb1, Lb2, Lb3 and Lb4 included in another second signal line set LS2 adjacent thereto may be located between the first opening 911 and the second opening 912.

The first opening 911 and the second opening 912 may be surrounded with the first bypassing portions DP1 of one first signal line set LS1. The first opening 911 and the second opening 912 may be surrounded with one first signal line set LS1 surrounding the first opening 911 and the second opening 912 and may be located between both opposing first signal line sets LS1 adjacent thereto. The first opening 911 may be surrounded with the second bypassing portions DP2 of one second signal line set LS2. The first opening 911 may be surrounded with one second signal line set LS2 surrounding the first opening 911 and may be located between both opposing second signal line sets LS2 adjacent thereto. The second opening 912 may be surrounded with the second bypassing portions DP2 of one second signal line set LS2. The second opening 912 may be surrounded with one second signal line set LS2 surrounding the second opening 912 and may be located between both opposing second signal line sets LS2 adjacent thereto.

Hereinafter, with reference to FIGS. 10 to 12, an arrangement of a plurality of openings 1015 of a sensing layer 1010 and an optical member 1020 will be described.

Figure 10:
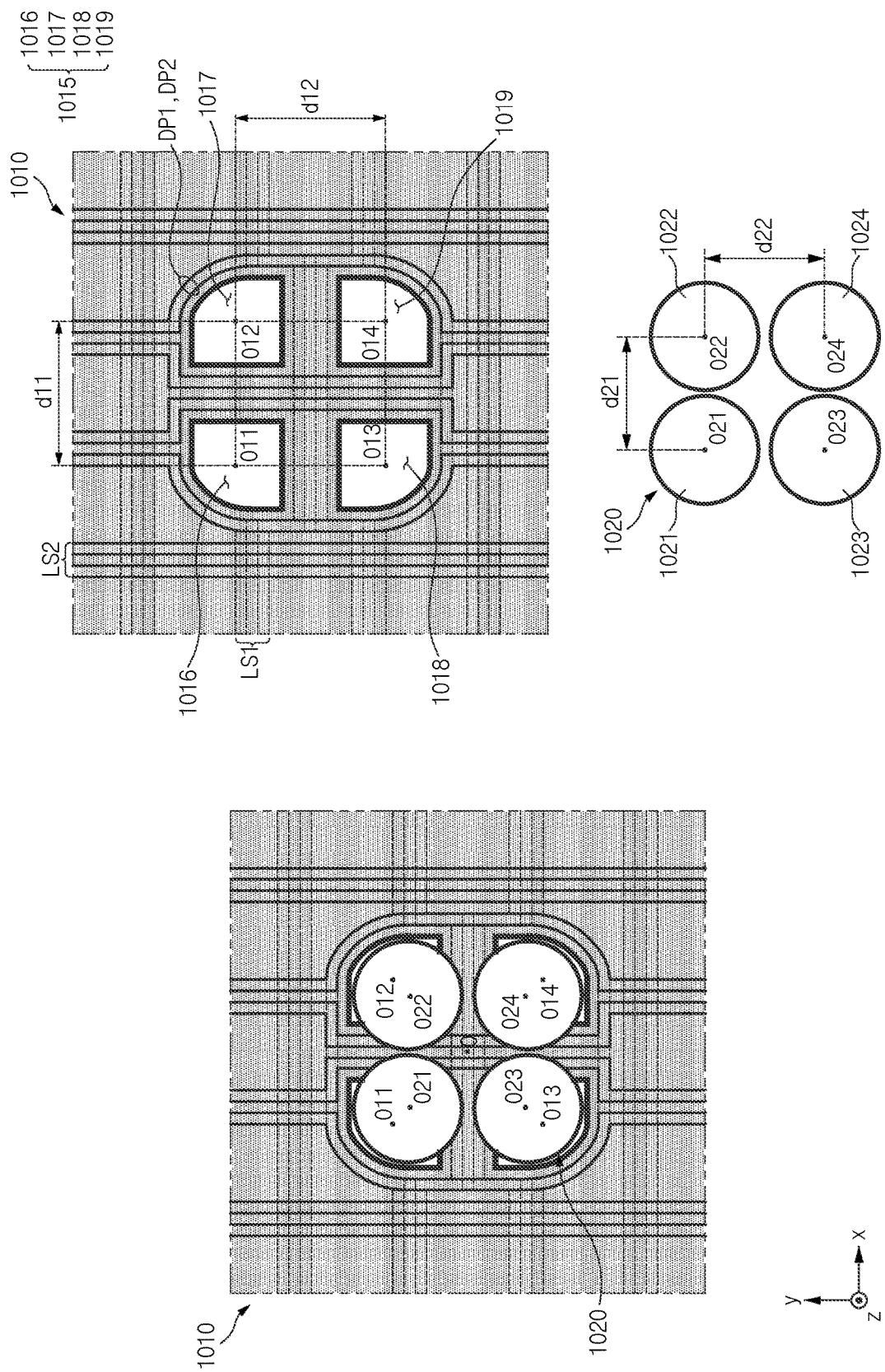
FIG. 10 is a diagram showing a sensing layer and an optical member of an electronic device according to an embodiment of the disclosure.

FIG. 10 is a diagram showing the sensing layer 1010 and the optical member 1020 of an electronic device according to an embodiment of the disclosure. FIG. 11 is a cross-sectional view showing one cross-section of an electronic device according to an embodiment of the disclosure. FIG. 12 is a diagram showing a detection area of biometric information acquired through a biometric sensor according to an embodiment of the disclosure.

Figure 11:
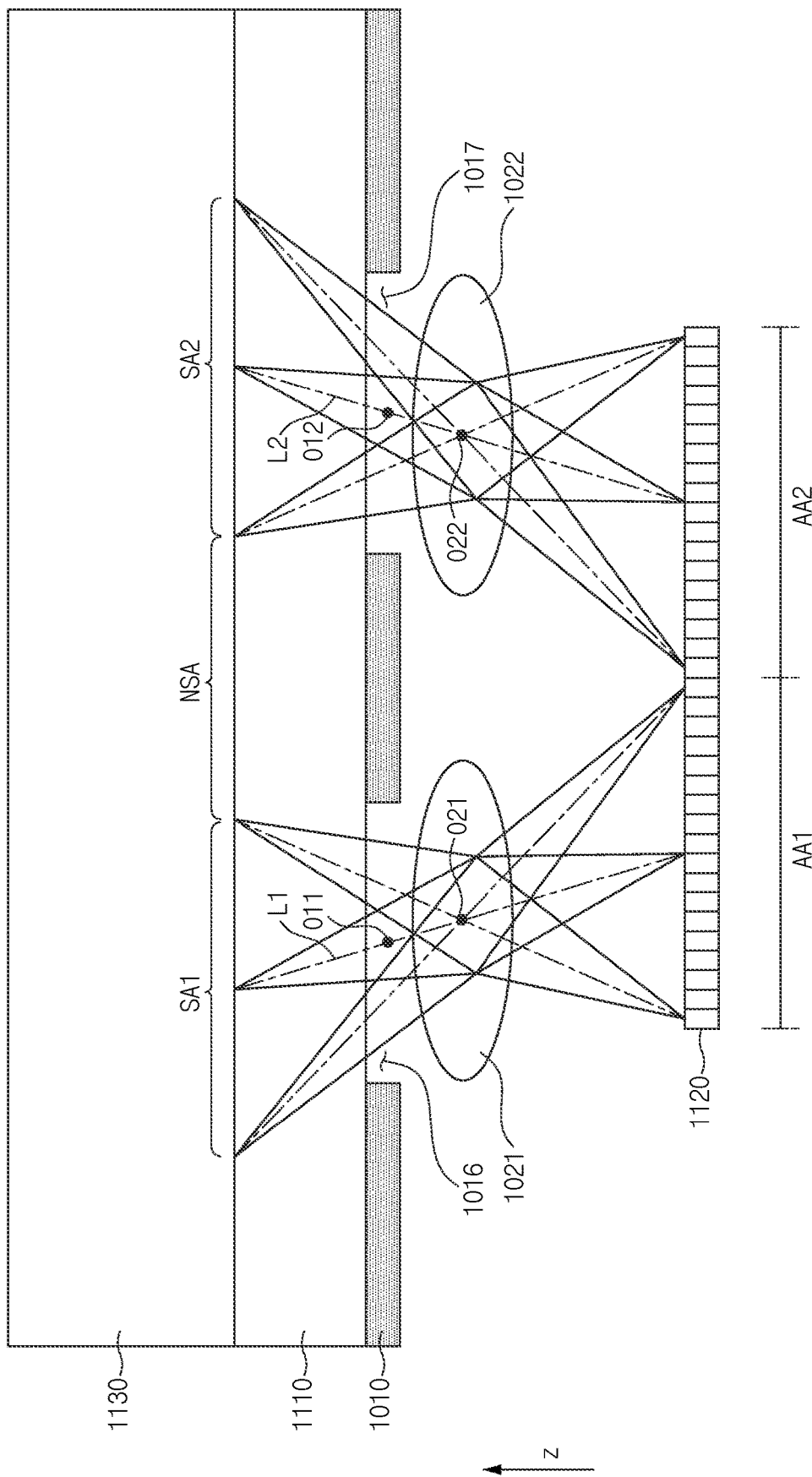
FIG. 11 is a cross-sectional view showing one cross-section of an electronic device according to an embodiment of the disclosure.
Figure 12:
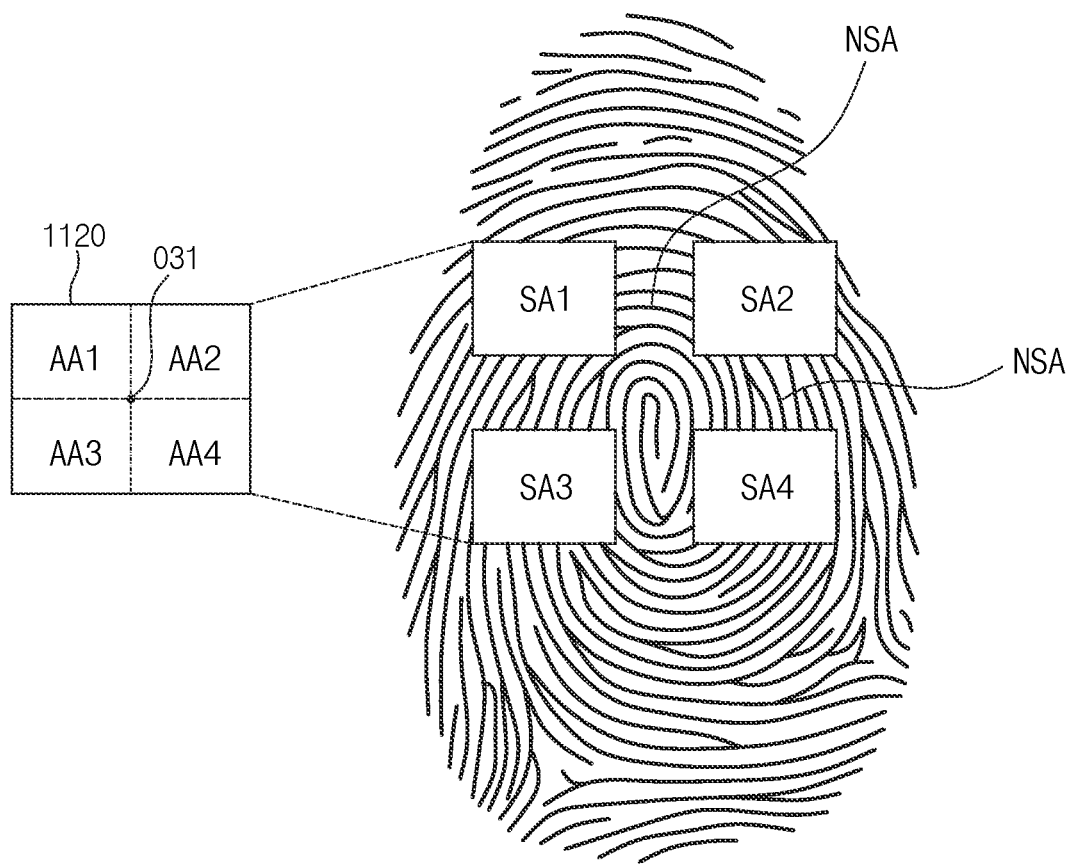
FIG. 12 is a diagram showing a detection area of biometric information acquired using a biometric sensor according to an embodiment of the disclosure.

Referring to FIGS. 10 to 12, an electronic device according to one embodiment (e.g., the electronic device 100 in FIG. 1 or the electronic device 1901 in FIG. 19) may include the sensing layer 1010, the optical member 1020, a display 1110 and a light-receiver 1120 of a biometric sensor (e.g., the biometric sensor 622 in FIG. 6). The sensing layer 1010 may include the plurality of openings 1015. The plurality of openings 1015 may include a first opening 1016, a second opening 1017, a third opening 1018, and a fourth opening 1019. The sensing layer 1010 may be referred to as the sensing layer 135 in FIG. 5. According to the embodiment, the sensing layer 1010 may be referred to as the sensing layer 135 in FIGS. 7 to 9.

The optical member 1020 may include a first optical member 1021 for collecting light passing through the first opening 1016, a second optical member 1022 for collecting light passing through the second opening 1017, a third optical member 1023 for collecting light passing through the third opening 1018, and a fourth optical member 1024 for collecting light passing through the fourth opening 1019. For example, the first optical member 1021, the second optical member 1022, the third optical member 1023 and the fourth optical member 1024 may be a light-collecting element including at least one lens.

In an electronic device according to the embodiment, the plurality of openings 1015 of the sensing layer 1010 and the optical member 1020 may not be aligned with each other in the third direction (e.g., the z-axis direction) (e.g., the thickness direction of the electronic device). For example, referring to FIG. 10, a center point O11 of the first opening 1016 and a center point O21 of the first optical member 1021 may not overlap each other along the third direction (e.g., the z-axis direction). A center point O12 of the second opening 1017 and a center point O22 of the second optical member 1022 may not overlap each other along the third direction (e.g., the z-axis direction). A center point O13 of the third opening 1018 and a center point O23 of the third optical member 1023 may not overlap each other along the third direction (e.g., the z-axis direction). A center point O14 of the fourth opening 1019 and a center point O24 of the fourth optical member 1024 may not overlap each other along the third direction (e.g., the z-axis direction). In another example, a virtual line passing through each of the center points O11, O12, O13, and O14 of the plurality of openings 1015 and each of the center points O21, O22, O23, and O24 of the optical members 1020 corresponding to the plurality of openings 1015 may be inclined relative to the third direction (e.g., the z-axis direction) by a predetermined angle. Referring to FIG. 11, a virtual line L1 passing through the center point O11 of the first opening 1016 and the center point O21 of the first optical member 1021 may not be substantially parallel to the third direction (e.g., the z-axis direction), and may be inclined by a specified angle with respect to the third direction (e.g., the z-axis direction). A virtual line L2 passing through the center point O12 of the second opening 1017 and the center point O22 of the second optical member 1022 may not be substantially parallel to the third direction (e.g., the z-axis direction), and may be inclined by a specified angle with respect to the third direction (e.g., the z-axis direction). the virtual line L1 passing through the center point O11 of the first opening 1016 and the center point O21 of the first optical member 1021, and the virtual line L2 passing through the center point O12 of the second opening 1017 and the center point O22 of the second optical member 1022 may not be substantially parallel to each other.

The plurality of openings 1015 of the sensing layer 1010 and the optical members 1020 may be arranged such that a path of the light passing through the plurality of openings 1015 and the optical members 1020 may be displaced toward a center 'O' of the sensing area (or toward a center O31 of the light-receiver 1120 of the biometric sensor of FIG. 12). For example, a distance between each of the center points O21, O22, O23, and O24 of the optical members 1020 and the center 'O' of the sensing area may be smaller than a distance between each of the center points O11, O12, O13, and O14 of the plurality of openings 1015 and the center 'O' of the sensing area. In another example, each of the spacings d11 and d12 between the center points O11, O12, O13, and O14 of the first opening 1016, the second opening 1017, the third opening 1018 and the fourth opening 1019 may be greater than each of spacings d21 and d22 between the center points O21, O22, O23, and O24 of the first optical member 1021, the second optical member 1022, the third optical member 1023 and the fourth optical member 1024.

Light passing through the plurality of openings 1015 of the sensing layer 1010 and passing through the optical members 1020 may be incident to the light-receiver 1120 of the biometric sensor. The light-receiver 1120 may include a first active area AA1 to which the light passing through the first opening 1016 and the first optical member 1021 is incident, a second active area AA2 to which the light passing through the second opening 1017 and the second optical member 1022 is incident, a third active area AA3 to which light passing through the third opening 1018 and the third optical member 1023, and a fourth active area AA4 to which light passing through the fourth opening 1019 and the fourth optical member 1024 is incident. The first active area AA1, the second active area AA2, the third active area AA3, and the fourth active area AA4 may be adjacent to each other. According to one embodiment, the first optical member 1021, the second optical member 1022, the third optical member 1023, and the fourth optical member 1024 may be displaced in a direction toward the center 'O' of the sensing area, so that the light passing through the plurality of openings 1015 spaced from each other may reach an entire area of the light receiver 1120. Thus, the light-receiver 1120 may not include a non-active area to which light is not incident.

Referring to FIGS. 11 and 12, the light reflected from a first area SA1 of an object 1130 (e.g., a finger) may be incident on the first active area AA1 of the light-receiver 1120. The biometric sensor may acquire biometric information (e.g., a fingerprint image) of the first area SA1 of the object 1130 (e.g., a finger) using the light incident on the first active area AA1 of the light-receiver 1120. The light reflected from a second area SA2 of the object 1130 (e.g., a finger) may be incident on the second active area AA2 of the light-receiver 1120. The biometric sensor may acquire biometric information (e.g., a fingerprint image) for the second area SA2 of the object 1130 (e.g., a finger) using the light incident on the second active area AA2 of the light-receiver 1120. The light reflected from a third area SA3 of the object 1130 (e.g., a finger) may be incident on the third active area AA3 of the light-receiver 1120. The biometric sensor may acquire biometric information (e.g., a fingerprint image) on the third area SA3 of the object 1130 (e.g., a finger) using the light incident on the third active area AA3 of the light-receiver 1120. The light reflected from a fourth area SA4 of the object 1130 (e.g., a finger) may be incident on the fourth active area AA4 of the light-receiver 1120. The biometric sensor may acquire biometric information (e.g., a fingerprint image) of the fourth area SA4 of the object 1130 (e.g., a finger) using the light incident on the fourth active area AA4 of the light-receiver 1120.

The first area SA1, the second area SA2, the third area SA3, and the fourth area SA4 of the object 1130 (or an entire fingerprint area) may be spaced apart from each other. The images acquired through the first active area AA1, the second active area AA2, the third active area AA3, and the fourth active area AA4 of the light-receiver 1120 may not be continuous images. A fifth area NSA on which biometric information (e.g., a fingerprint image) is not acquired may be located between the first area SA1, the second area SA2, the third area SA3, and fourth area SA4 of the object 1130. The electronic device according to one embodiment may separate the images acquired using the first active area AA1, the second active area AA2, the third active area AA3 and the fourth active area AA4 of the light-receiver 1120 from each other, and may correct (e.g., rotate or flip) each separated image.

Hereinafter, with reference to FIG. 13, an electronic device according to one embodiment will be described.

Figure 13:
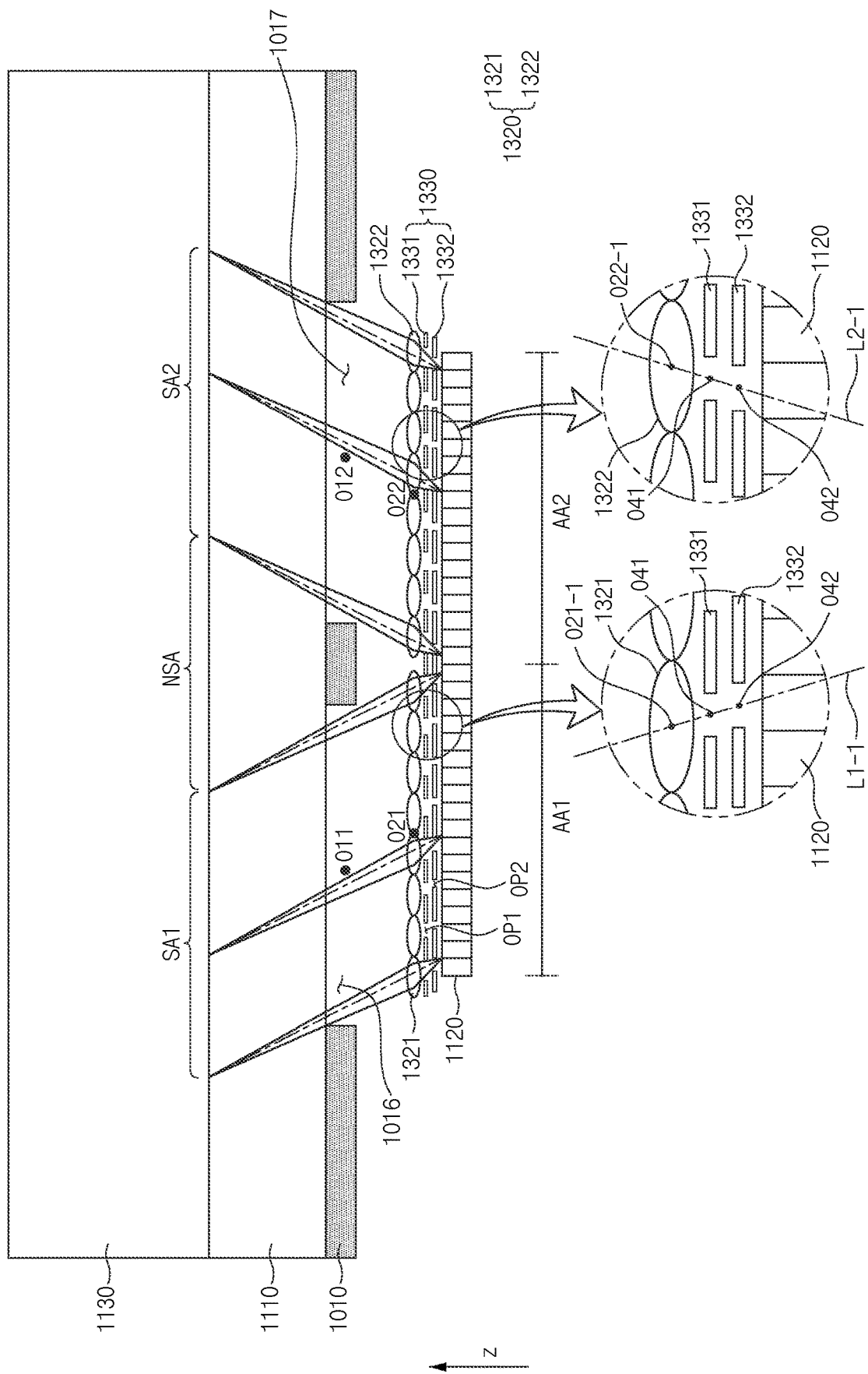
FIG. 13 is a cross-sectional view showing one cross-section of an electronic device according to an embodiment of the disclosure.

FIG. 13 is a cross-sectional view showing one cross-section of an electronic device according to an embodiment of the disclosure.

Referring to FIG. 13, an electronic device (e.g., the electronic device 100 in FIG. 1 or the electronic device 1901 in FIG. 19) according to one embodiment may include the sensing layer 1010, an optical member 1320, a light-blocking layer 1330, the display 1110, and the light-receiver 1120 of the biometric sensor (e.g., the biometric sensor 622 in FIG. 6). The sensing layer 1010 may include a plurality of openings 1015. The plurality of openings 1015 may include the first opening 1016, the second opening 1017, the third opening 1018 (see FIG. 10) and the fourth opening 1019 (see FIG. 10). The sensing layer 1010 may be referred to as the sensing layer 135 in FIG. 5. However, the sensing layer 1010 may be referred to as the sensing layer 135 in FIGS. 7 to 9. Hereinafter, a component identical with that in FIGS. 10 to 12 may be referred to as that in FIGS. 10 to 12.

The optical member 1320 may include a first optical member 1321 for collecting light passing through the first opening 1016, a second optical member 1322 for collecting light passing through the second opening 1017, a third optical member (not shown) for collecting light passing through the third opening 1018 (see FIG. 10) and a fourth optical member (not shown) for collecting light passing through the fourth opening 1019 (see FIG. 10). In the electronic device according to one embodiment, the optical member 1320 may include a micro lens. According to an embodiment, the optical member 1320 in the electronic device may be re-displaced, and only the light-blocking layer 1330 or an optical fiber (not shown) may be included therein.

The plurality of openings 1016 and 1017 of the sensing layer 1010, the optical members 1321 and 1322, and the light-blocking layer 1330 may not be aligned with each other in the third direction (e.g., the z-axis direction) (e.g., thickness direction of the electronic device). For example, a center point O11 of the first opening 1016 and a center point O21 of the first optical member 1321 may not overlap each other along the third direction (e.g., the z-axis direction). A center point O12 of the second opening 1017 and a center point O22 of the second optical member 1322 may not overlap each other along the third direction (e.g., the z-axis direction).

The light-blocking layer 1330 may be positioned between the optical members 1321 and 1322 and the light-receiver 1120 of the biometric sensor. The light-blocking layer 1330 may include a material that blocks light. The light-blocking layer 1330 may prevent light reflected from an area other than a measurement target area of the object 1130 from reaching the light-receiver 1120. The light-blocking layer 1330 may include a first light-blocking layer 1331 and a second light-blocking layer 1332 located below the first light-blocking layer 1331 in the third direction (e.g., the z-axis direction) (e.g., the thickness direction of the electronic device). The first light-blocking layer 1331 may include a plurality of openings OP1 respectively corresponding to the micro lenses of the optical members 1320. The second light-blocking layer 1332 may include a plurality of openings OP2 respectively corresponding to the micro lenses. The light-blocking layer 1330 is not limited to that shown in FIG. 13. For example, each of the first light-blocking layer 1331 and the second light-blocking layer 1332 may include a pin-hole structure. In another example, the electronic device may include a single-layered optical fiber structure oriented at a predetermined angle with respect to the z-axis instead of the light-blocking layer 1330.

The plurality of openings 1016 and 1017 of the sensing layer 1010, the optical members 1320, and the plurality of openings OP1 and OP2 of the light-blocking layer 1330 may be arranged such that a path of the light is displaced toward a center of the light-receiver 1120 of the biometric sensor (or toward a center of the sensing area). When the optical member 1320 includes the micro lenses, a center point O21-1 of one micro lens of the first optical member 1321, a center point O41 of the opening OP1 of the first light-blocking layer 1331 corresponding to one micro lens, and a center point O42 of the opening OP2 of the second light-blocking layer 1332 corresponding to one micro lens may not overlap each other along the third direction (e.g., the z-axis direction). A center point O22-1 of one micro lens of the second optical member 1322, a center point O41 of the opening OP1 of the first light-blocking layer 1331 corresponding to one micro lens, and a center point O42 of the opening OP2 of the second light-blocking layer 1332 corresponding to one micro lens may not overlap each other along the third direction (e.g., the z-axis direction). For example, a virtual line L1-1 passing through the center point O21-1 of one micro lens of the first optical member 1321, the center point O41 of the opening OP1 of the first light-blocking layer 1331 corresponding to one micro lens, and the center point O42 of the opening OP2 of the second light-blocking layer 1332 corresponding to one micro lens may not be substantially parallel to the third direction (e.g., the z-axis direction), and may be inclined by a specified angle with respect to the third direction (e.g., the z-axis direction). A virtual line L2-1 passing through the center point O22-1 of one micro lens of the second optical member 1322, the center point O41 of the opening OP1 of the first light-blocking layer 1331 corresponding to one micro lens, and the center point O42 of the opening OP2 of the second light-blocking layer 1332 corresponding to one micro lens may not be substantially parallel to the third direction (e.g., the z-axis direction), and may be inclined by a specified angle with respect to the third direction (e.g., the z-axis direction). The virtual line L1-1 passing through the center point O21-1 of one micro lens of the first optical member 1321, the center point O41 of the opening OP1 of the first light-blocking layer 1331 corresponding to one micro lens, and the center point O42 of the opening OP2 of the second light-blocking layer 1332 corresponding to one micro lens and the virtual line L2-1 passing through the center point O22-1 of one micro lens of the second optical member 1322, the center point O41 of the opening OP1 of the first light-blocking layer 1331 corresponding to one micro lens, and the center point O42 of the opening OP2 of the second light-blocking layer 1332 corresponding to one micro lens may not be substantially parallel to each other.

Light passing sequentially through the plurality of openings 1016 and 1017 of the sensing layer 1010, the optical members 1321 and 1322, the plurality of openings OP1 of the first light-blocking layer 1331 and the plurality of openings OP2 of the second light-blocking layer 1332 may be incident to the light-receiver 1120 of the biometric sensor. The light-receiver 1120 may include a first active area AA1 into which the light passing through the first opening 1016 and the first optical member 1321 is incident, and a second active area AA2 into which the light passing through the second opening 1017 and the second optical member 1322 is incident. The first active area AA1 and the second active area AA2 may be adjacent to each other.

Light reflected from the first area SA1 of the object 1130 (e.g., a finger) may be incident on the first active area AA1 of the light-receiver 1120. The biometric sensor may acquire biometric information (e.g., a fingerprint image) of the first area SA1 of the object 1130 (e.g., a finger) using the light incident on the first active area AA1 of the light-receiver 1120. The light reflected from the second area SA2 of the object 1130 (e.g., a finger) may be incident on the second active area AA2 of the light-receiver 1120. The biometric sensor may acquire biometric information (e.g., a fingerprint image) for the second area SA2 of the object 1130 (e.g., a finger) using the light incident on the second active area AA2 of the light-receiver 1120. The first area SA1 and the second area SA2 of the object 1130 may be spaced apart from each other by a predetermined distance. The fifth area NSA on which biometric information (e.g., a fingerprint image) is not acquired may be located between the first area SA1 and the second area SA2 of the object 1130.

Hereinafter, with reference to FIGS. 14 to 16, an arrangement of the plurality of openings 1015 of the sensing layer 1010 and the optical members 1020 in the electronic device according to one embodiment will be described.

Figure 14:
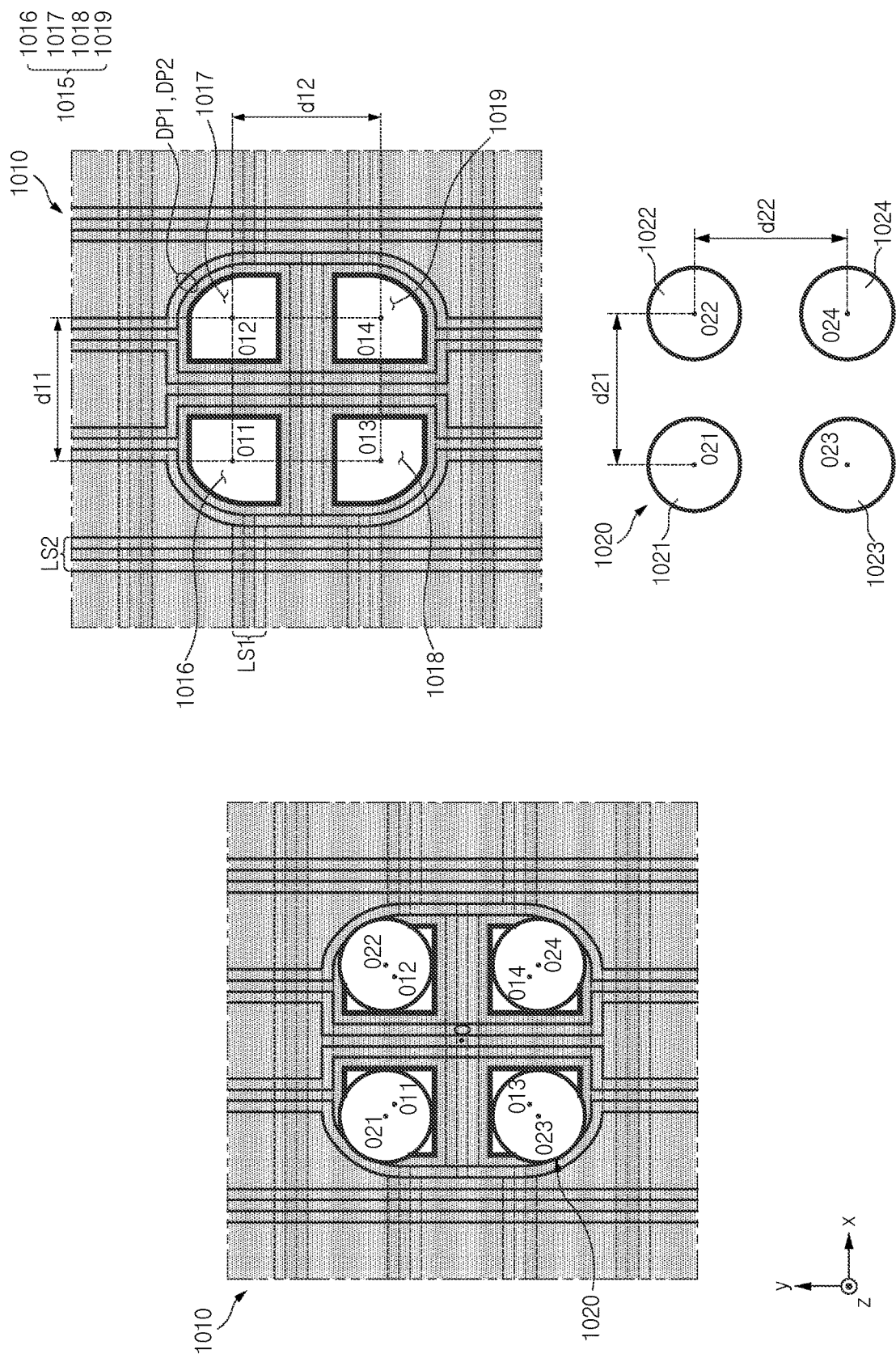
FIG. 14 is a diagram showing a sensing layer and an optical member of an electronic device according to an embodiment of the disclosure.

FIG. 14 is a diagram showing the sensing layer 1010 and the optical member 120 of the electronic device according to an embodiment of the disclosure. FIG. 15 is a cross-sectional view showing one cross-section of an electronic device according to an embodiment of the disclosure. FIG. 16 is a diagram showing a detection area of biometric information acquired through a biometric sensor according to an embodiment of the disclosure.

Figure 15:
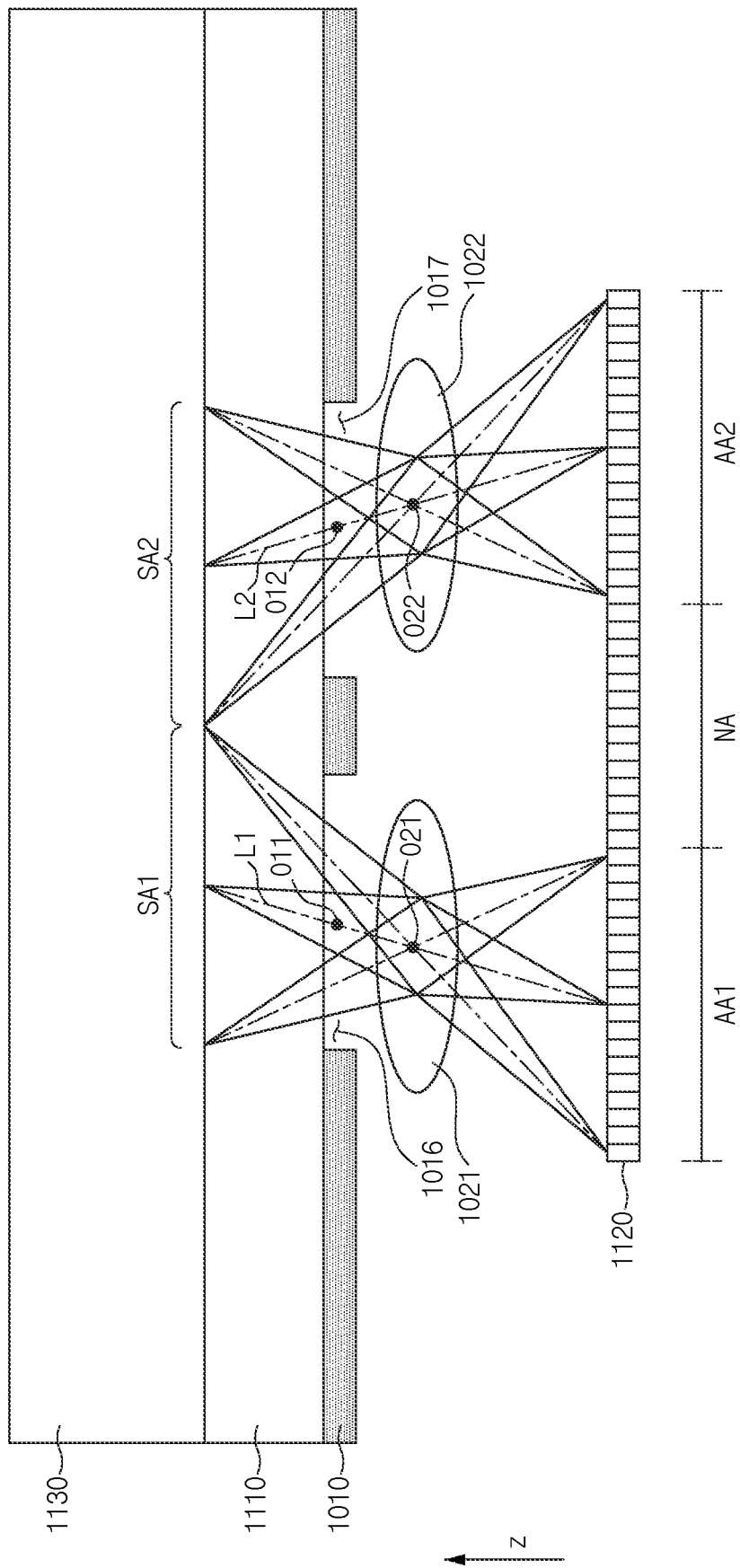
FIG. 15 is a cross-sectional view showing one cross-section of an electronic device according to an embodiment of the disclosure.
Figure 16:
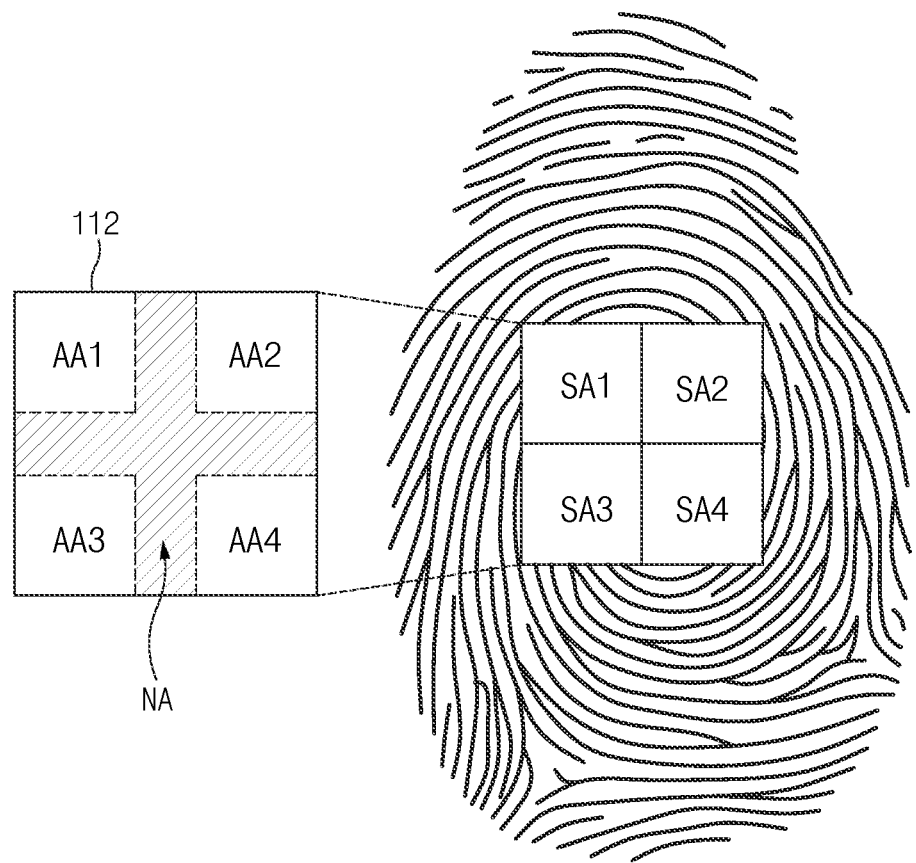
FIG. 16 is a diagram showing a detection area of biometric information acquired using a biometric sensor according to an embodiment of the disclosure.

Referring to FIGS. 14 to 16, an electronic device according to one embodiment (e.g., the electronic device 100 in FIG. 1 or the electronic device 1901 in FIG. 19) may include the sensing layer 1010, the optical member 1020, the display 1110, and the light-receiver 1120 of a biometric sensor (e.g., the biometric sensor 622 in FIG. 6). The sensing layer 1010 may include the plurality of openings 1015. The plurality of openings 1015 may include the first opening 1016, the second opening 1017, the third opening 1018, and the fourth opening 1019. The sensing layer 1010 may be referred to as the sensing layer 135 in FIG. 5. According to the embodiment, the sensing layer 1010 may be referred to as the sensing layer 135 in FIGS. 7 to 9.

The optical member 1020 may include the first optical member 1021 for collecting light passing through the first opening 1016, the second optical member 1022 for collecting light passing through the second opening 1017, the third optical member for collecting light passing through the third opening 1018 and the fourth optical member 1024 for collecting light passing through the fourth opening 1019. For example, each of the first optical member 1021, the second optical member 1022, the third optical member 1023, and the fourth optical member 1024 may be a light-collecting element including at least one lens. For example, the optical member 1020 may include a lens, a micro lens, a pinhole array, an optical fiber, or a collimator.

In the electronic device according to the embodiment, the plurality of openings 1015 of the sensing layer 1010 and the optical members 1020 may not be aligned with each other in the third direction (e.g., the z-axis direction) (e.g., the thickness direction of the electronic device). For example, the center point O11 of the first opening 1016 and the center point O21 of the first optical member 1021 may not overlap each other along the third direction (e.g., the z-axis direction). The center point O12 of the second opening 1017 and the center point O22 of the second optical member 1022 may not overlap each other along the third direction (e.g., the z-axis direction). The center point O13 of the third opening 1018 and the center point O23 of the third optical member 1023 may not overlap each other along the third direction (e.g., the z-axis direction). The center point O14 of the fourth opening 1019 and the center point O24 of the fourth optical member 1024 may not overlap each other along the third direction (e.g., the z-axis direction). The virtual line L1 passing through the center point O11 of the first opening 1016 and the center point O21 of the first optical member 1021 may not be substantially parallel to the third direction (e.g., the z-axis direction), and may be inclined by a specified angle with respect to the third direction (e.g., the z-axis direction). The virtual line L2 passing through the center point O12 of the second opening 1017 and the center point O22 of the second optical member 1022 may not be substantially parallel to the third direction (e.g., the z-axis direction), and may be inclined by a specified angle with respect to the third direction (e.g., the z-axis direction). The virtual line L1 passing through the center point O11 of the first opening 1016 and the center point O21 of the first optical member 1021 may not be substantially parallel to the virtual line L2 passing through the center point O12 of the second opening 1017 and the center point O22 of the second optical member 1022.

The plurality of openings 1015 of the sensing layer 1010 and the optical members 1020 may be arranged such that a path of the light passing through the plurality of openings 1015 and the optical members 1020 is displaced in a radial direction from the center 'O' of the sensing area (or in a direction away from the center of the light-receiver 1120 of the biometric sensor). For example, a distance between each of the center points O21, O22, O23, and O24 of the optical members 1020 and the center 'O' of the sensing area may be larger than a distance between each of the center points O11, O12, O13, and O14 of the plurality of openings 1015 and the center 'O' of the sensing area. In another example, each of the spacings d11 and d12 between the center points O11, O12, O13, and O14 of the first opening 1016, the second opening 1017, the third opening 1018 and the fourth opening 1019 may be smaller than each of the spacings d21 and d22 between the center points O21, O22, O23, and O24 of the first optical member 1021, the second optical member 1022, the third optical member 1023 and the fourth optical member 1024.

Light passing through the plurality of openings 1015 of the sensing layer 1010 and passing through the optical members 1020 may be incident to the light-receiver 1120 of the biometric sensor. The light-receiver 1120 includes the first active area AA1 into which light passing through the first opening 1016 and the first optical member 1021 is incident, the second active area AA2 into which light passing through the second opening 1017 and the second optical member 1022 is incident, the third active area AA3 into which light passing through the third opening 1018 and the third optical member 1023 is incident, the fourth active area AA4 into which light passing through the fourth opening 1019 and the fourth optical member 1024 is incident, and a non-active area NA to which the light passing through the optical members 1020 is not incident. The first active area AA1, the second active area AA2, the third active area AA3, and the fourth active area AA4 may be spaced apart from each other. At least a portion of the non-active area NA may be located between the first active area AA1, the second active area AA2, the third active area AA3, and the fourth active area AA4.

Light reflected from the first area SA1 of the object 1130 (e.g., a finger) may be incident on the first active area AA1 of the light-receiver 1120. The biometric sensor may acquire biometric information (e.g., a fingerprint image) of the first area SA1 of the object 1130 (e.g., a finger) using the light incident on the first active area AA1 of the light-receiver 1120. The light reflected from the second area SA2 of the object 1130 (e.g., a finger) may be incident on the second active area AA2 of the light-receiver 1120. The biometric sensor may acquire biometric information (e.g., a fingerprint image) for the second area SA2 of the object 1130 (e.g., a finger) using the light incident on the second active area AA2 of the light-receiver 1120. The light reflected from the third area SA3 of the object 1130 (e.g., a finger) may be incident on the third active area AA3 of the light-receiver 1120. The biometric sensor may acquire biometric information (e.g., a fingerprint image) of the third area SA3 of the object 1130 (e.g., a finger) using the light incident on the third active area AA3 of the light-receiver 1120. The light reflected from the fourth area SA4 of the object 1130 (e.g., a finger) may be incident on the fourth active area AA4 of the light-receiver 1120. The biometric sensor may acquire biometric information (e.g., a fingerprint image) of the fourth area SA4 of the object 1130 (e.g., a finger) using the light incident on the fourth active area AA4 of the light-receiver 1120.

The first area SA1, the second area SA2, the third area SA3, and the fourth area SA4 of the object 1130 may be adjacent to each other. According to one embodiment, the first optical member 1021, the second optical member 1022, the third optical member 1023 and the fourth optical member 1024 may be displaced in a direction radial from the center 'O' of the sensing area, such that a continuous image of a large area of the object 1130 may be obtained using light passing through the plurality of openings 1015 spaced from each other.

The electronic device according to one embodiment may separate the images acquired using the first active area AA1, the second active area AA2, the third active area AA3 and the fourth active area AA4 of the light-receiver 1120 from each other and correct (e.g., rotate or flip) each separated image. The electronic device may delete or remove a portion acquired through the non-active area NA of the light-receiver 1120. The electronic device according to one embodiment may acquire one continuous image using each of the corrected images.

Hereinafter, with reference to FIGS. 14, 15, and 17, an electronic device according to one embodiment will be described.

Figure 17:
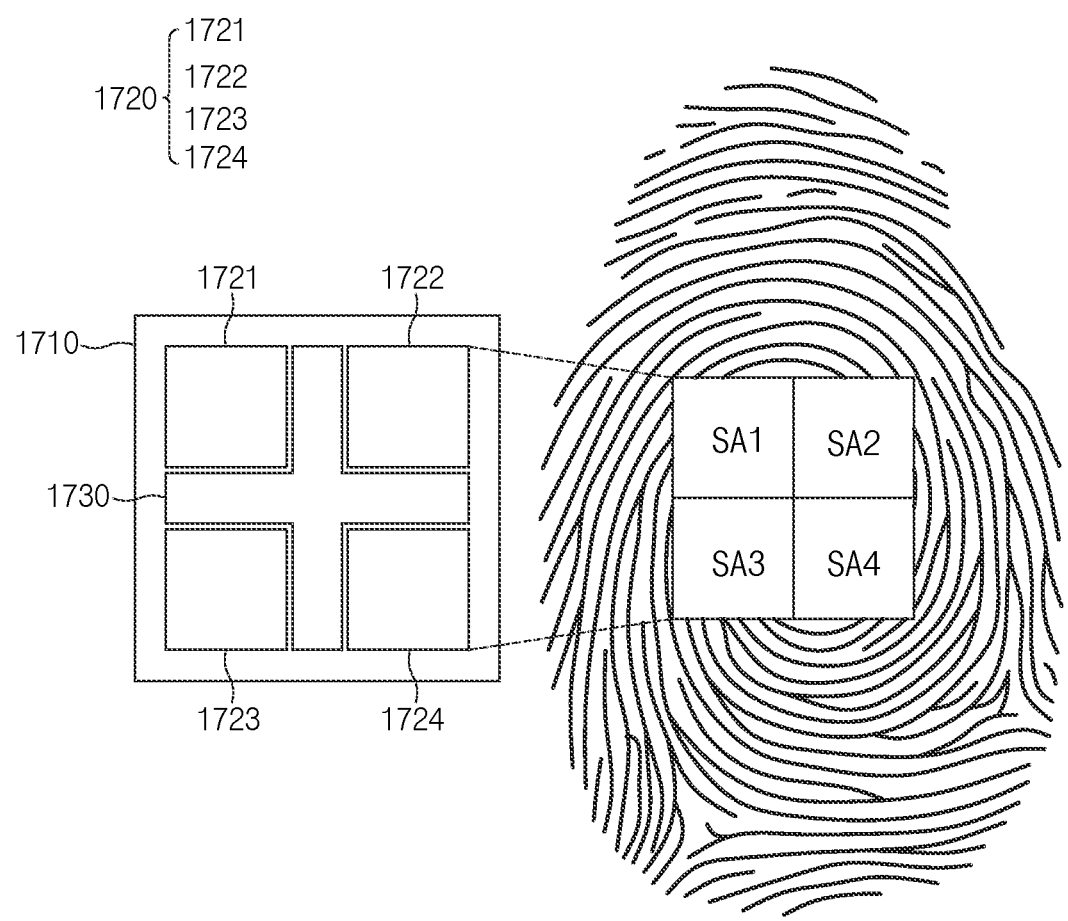
FIG. 17 is a diagram showing a biometric sensor included in an electronic device according to an embodiment of the disclosure.

FIG. 17 is a diagram showing a biometric sensor included in an electronic device according to an embodiment of the disclosure.

Referring to FIG. 17, according to one embodiment, a biometric sensor 1710 may include a light-receiver 1720 and a sensing circuit 1730. The light-receiver 1720 may include a first light-receiver 1721, a second light-receiver 1722, a third light-receiver 1723 and a fourth light-receiver 1724 that are spaced apart from each other. At least a portion of the sensing circuit 1730 may be positioned between the first light-receiver 1721, the second light-receiver 1722, the third light-receiver 1723, and the fourth light-receiver 1724. The sensing circuit 1730 may include at least one electrical element that creates and processes biometric information (e.g., a fingerprint image) using light incident to the light-receiver 1720. For example, the sensing circuit 1730 may include at least one of a control circuit, an analog-to-digital converter (ADC), a memory (e.g., First In First Out (FIFO) register or One-Time Programmable memory (OTP)), a watchdog timer (WDT), a power management unit (PMU) or a communication module (e.g., Serial Peripheral Interface (SPI)).

Light passing through the plurality of openings 1015 of the sensing layer 1010 and passing through the optical members 1020 may be incident on the light-receiver 1720 of the biometric sensor 1710. Light passing through the first opening 1016 and the first optical member 1021 may be incident to the first light-receiver 1721. Light passing through the second opening 1017 and the second optical member 1022 may be incident on the second light-receiver 1722. Light passing through the third opening 1018 and the third optical member 1023 may be incident on the third light-receiver 1723. Light passing through the fourth opening 1019 and the fourth optical member 1024 may be incident to the fourth light-receiver 1724. According to one embodiment, the first light-receiver 1721, the second light-receiver 1722, the third light-receiver 1723 and the fourth light-receiver 1724 may be arranged so that the light-receiver 1720 does not include a non-active area which light does not reach. This may increase efficiency of the light-receiver 1720. Further, positioning the sensing circuit 1730 in a space between the first light-receiver 1721, the second light-receiver 1722, the third light-receiver 1723, and the fourth light-receiver 1724 may allow a size of each of the biometric sensor 1710 and the electronic device in which the biometric sensor 1710 is disposed to be reduced.

The electronic device 100 according to an embodiment may include the display 130 including the sensing area 139; the sensing layer 135 located below the display 130, including a plurality of openings 137, and sensing a touch input or a hovering input; and the biometric sensor 622 for receiving light emitted from the sensing area 139 of the display 130 and reflected from an external object, wherein the sensing layer 135 includes first signal line sets LS1 that are repeatedly arranged and spaced from each other by a specified spacing and second signal line sets LS2 that are repeatedly arranged and spaced from each other by a specified spacing, wherein each of the first signal line sets LS1 includes a plurality of first signal lines La1, La2, La3 and La4 extending in the first direction, wherein each of the second signal line sets LS2 includes a plurality of second signal lines Lb1, Lb2, Lb3 and Lb4 extending in a second direction intersecting the first direction, wherein at least one of the plurality of first signal lines La1, La2, La3 and La4 or the plurality of second signal lines Lb1, Lb2, Lb3 and Lb4 extends along and in a portion of the sensing layer between the plurality of openings 137, wherein the plurality of openings 137 of the sensing layer 135 may be disposed in a path along which the light is reflected from the object and is incident on the biometric sensor 622.

The electronic device 100 according to one embodiment may further include a processor 1920 operatively connected to the display 130 and the biometric sensor 622, wherein the processor 1920 may be configured to acquire biometric information based on at least a portion of the light incident to the biometric sensor 622.

The plurality of openings 510 includes the first opening 511, the second opening 512, the third opening 513 and the fourth opening 514 which are arranged in a grid manner, wherein at least one of the plurality of first signal lines La1, La2, La3 and La4 includes first bypassing portions DP1 respectively extending along edges of the plurality of openings 510, wherein at least one of the plurality of second signal lines Lb1, Lb2, Lb3, and Lb4 includes second bypassing portions DP2 respectively extending along edges of the plurality of openings 510, wherein the first bypassing portion DP1 may extend along and in a portion of the sensing layer between the first opening 511 and the third opening 513, and the second bypassing portion DP2 may extend along and in a portion of the sensing layer between the first opening 511 and the second opening 512.

The plurality of openings 710 may include the first opening 711 and the second opening 712 that are arranged in one direction, wherein at least one of the plurality of second signal lines Lb1, Lb2, Lb3, and Lb4 may include bypassing portions DP2 respectively extending along edges of the plurality of openings 710, wherein the bypassing portion DP2 may extend along and in a portion of the sensing layer between the first opening 711 and the second opening 712.

The plurality of openings 810 may include the first opening 811, the second opening 812, the third opening 813 and the fourth opening 814 arranged in a grid manner, wherein the plurality of first signal lines La1, La2, La3 and La4 of one of the plurality of first signal line sets LS1 may extend along and in a portion of the sensing layer between the first opening 811 and the third opening 813 and may extend in the first direction, wherein the plurality of second signal lines Lb1, Lb2, Lb3 and Lb4 of one of the plurality of second signal line sets LS2 may extend in the second direction and may extend along and in a portion of the sensing layer between the first opening 811 and the second opening 812.

The plurality of openings 910 may include the first opening 911 and the second opening 912 arranged in one direction, wherein the plurality of second signal lines Lb1, Lb2, Lb3 and Lb4 of at least one of the plurality of second signal line sets LS2 may extend along and in a portion of the sensing layer between the first opening 911 and the second opening 912 and may extend in the second direction.

The electronic device according to one embodiment may further include the optical member 621 positioned between the sensing layer 135 and the biometric sensor 622 and collecting light that has passed through the plurality of openings 510 of the sensing layer 135.

The plurality of openings 1015 of the sensing layer 1010 and the optical member 1020 may be arranged such that a path of the light passing through the plurality of openings 1015 of the sensing layer 1010 and the optical member 1020 is displaced toward a center 'O' of the sensing area.

The optical member 1020 may include a plurality of lenses 1021, 1022, 1023, and 1024, wherein a distance between centers of the plurality of openings 1015 of the sensing layer 1010 may be greater than a distance between centers of the plurality of lenses 1021, 1022, 1023, and 1024.

The biometric sensor may include the light-receiver 1120 to which the light is incident, wherein the light-receiver 1120 includes a plurality of active areas AA1, AA2, AA3, and AA4 corresponding to the plurality of openings 1015, wherein the processor 1920 may be configured to acquire biometric information about spaced-apart areas SA1, SA2, SA3, and SA4 of the object respectively using the plurality of active areas AA1, AA2, AA3, and AA4 of the light-receiver 1120.

The plurality of openings 1015 of the sensing layer 1010 and the optical member 1020 may be arranged such that a path of light passing through the plurality of openings 1015 of the sensing layer 1010 and the optical member 1020 is displaced in a direction radial from a center 'O' of the sensing area.

The optical member 1020 may include a plurality of lenses 1021, 1022, 1023, 1024, wherein a distance between centers of the plurality of openings 1015 of the sensing layer 1010 may be smaller than a distance between centers of the plurality of lenses 1021, 1022, 1023, and 1024.

The biometric sensor may include the light-receiver 1120 to which the light is incident, wherein the light-receiver 1120 may include a plurality of active areas AA1, AA2, AA3, and AA4 corresponding to the plurality of openings 1015, wherein the processor 1920 may be configured to acquire biometric information on a plurality of areas SA1, SA2, SA3, and SA4 of the object adjacent to each other respectively using the plurality of active areas AA1, AA2, AA3, and AA4 of the light-receiver 1120.

The biometric sensor 1710 may include the plurality of light-receivers 1721, 1722, 1723, and 1724 spaced from each other and a sensing circuit 1730 positioned between the plurality of light-receivers 1721, 1722, 1723, and 1724.

The electronic device according to one embodiment may further include the light-blocking layer 1330 or a single-layered optical fiber structure oriented at a predefined angle, wherein the light-blocking layer or the structure is located between the sensing layer and the biometric sensor and includes openings OP1 and OP2 through which the light passing through the plurality of openings 1015 of the sensing layer 1010 passes.

Hereinafter, with reference to FIG. 18, an operation configuration of the electronic device according to one embodiment will be described.

Figure 18:
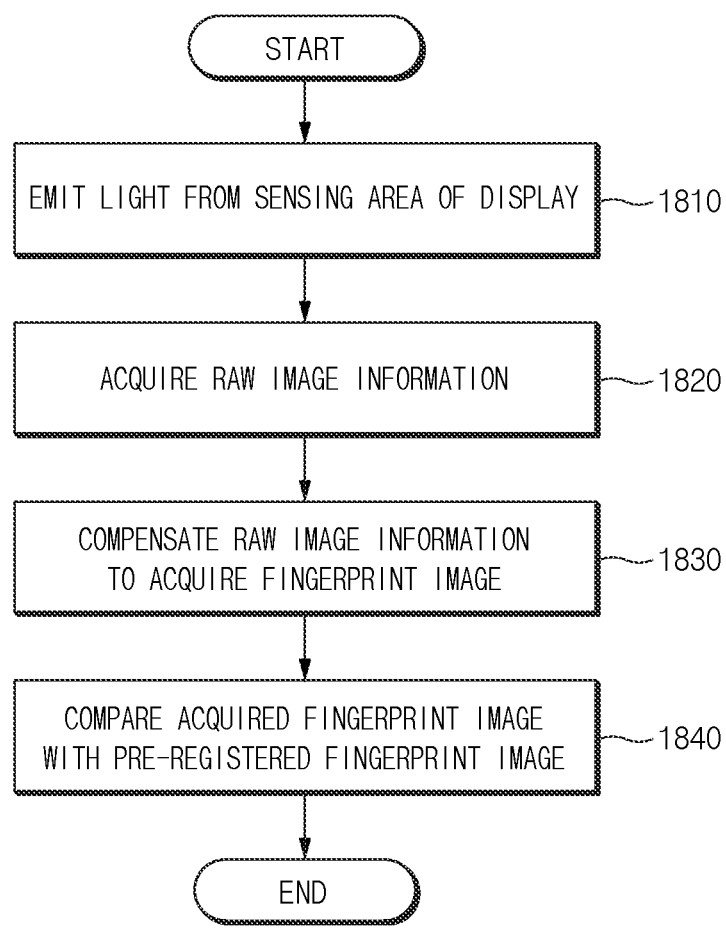
FIG. 18 is a flowchart showing an operation configuration of an electronic device according to an embodiment of the disclosure.

FIG. 18 is a flowchart showing the operation configuration of the electronic device according to an embodiment of the disclosure.

Hereinafter, an operation of the electronic device (e.g., the electronic device 100 in FIG. 1 or the electronic device 1901 in FIG. 19) may be referred to as an operation of a processor (e.g., the processor 1920 in FIG. 19).

Referring to FIG. 18, in operation 1810, the electronic device may allow a sensing area (e.g., the sensing area 139 of FIG. 3) of a display (e.g., the display 130 in FIG. 3) to emit light. The electronic device according to one embodiment may allow the sensing area of the display to emit light based on sensing of an object (e.g., a finger) touch.

In operation 1820, the electronic device may acquire raw image information via a biometric sensor (e.g., the biometric sensor 622 in FIG. 6). For example, light emitted from the display and reflected from the object (e.g., a finger) passes through a plurality of openings of a sensing layer (e.g., the sensing layer 135 in FIG. 5) and an optical member (e.g., the optical member 1020 in FIG. 10)) and reaches the biometric sensor. The biometric sensor may detect the light reflected from the object and passing through the plurality of openings of the sensing layer and the optical member. The electronic device according to one embodiment may acquire or create raw image information using light detected through the biometric sensor.

In operation 1830, the electronic device may correct or compensate the raw image information and thus acquire or create a fingerprint image. According to one embodiment, the electronic device may divide the light-receiver of the biometric sensor into a plurality of active areas, and may separate the acquired raw image information into portions corresponding to the plurality of active areas, respectively. For example, the electronic device may divide the light-receiver of the biometric sensor into four active areas, and may separate the acquired raw image information into four portions corresponding to the four divided active areas, respectively. For example, the electronic device may separate the raw image information into an area acquired through the first active area AA1, an area acquired through the second active area AA2, an area acquired through the third active area AA3, and an area acquired through the fourth active area AA4. The electronic device may separate and delete a portion obtained using the non-active area NA of the light-receiver from the raw image information. In this connection, each of the separated portions of the raw image information may be an image rotated or inverted while passing through an optical member. The electronic device may correct (e.g., rotating or inverting each of the separated portions of the raw image information) and thus may acquire the fingerprint image. According to another embodiment, the electronic device may correct (e.g., rotate or invert) each of the portions of the raw image information acquired through each of light-receivers spaced apart from each other (e.g., a plurality of light-receivers 1720 in FIG. 17) to obtain a fingerprint image.

In operation 1840, the electronic device may compare the acquired fingerprint image with a pre-registered fingerprint image. When the electronic device determines that the acquired fingerprint image matches the registered fingerprint image, the device may perform a specified function (e.g., user authentication, payment, specified operation, and execution of a function or application). When the electronic device determines that the acquired fingerprint image does not match the pre-registered fingerprint image, the device may provide a notification or feedback to the user indicating that fingerprint authentication has failed through an output device (e.g., the display module 1960, a sound output module (or device) 1955, an audio module 1970, and/or a haptic module 1979 in FIG. 19 or the display 130 in FIG. 3).

An electronic device according to one embodiment may emit light from a sensing area of the display toward an external object, acquire raw image information on a plurality of areas of the object, based on the light reflected from the object and passing through a plurality of openings of the sensing layer located under the display, and incident on the biometric sensor, and correct individual portions of the raw image information respectively corresponding to the plurality of areas of the object, and acquire a fingerprint image based on the corrected individual portions.

The electronic device according to one embodiment may divide the light-receiver of the biometric sensor into a plurality of active areas, and separate the raw image information into the individual portions respectively corresponding to the plurality of active areas.

The electronic device according to one embodiment may delete a portion acquired using a non-active area of the light-receiver from the raw image information.

The electronic device according to one embodiment may correct each of the portions of the raw image information acquired respectively through light-receivers of the biometric sensor spaced from each other.

The electronic device according to one embodiment may compare the acquired fingerprint image with a pre-registered fingerprint image; and perform a specified function when the acquired fingerprint image matches the pre-registered fingerprint image.

FIG. 19 is a block diagram illustrating an electronic device 1901 in a network environment 1900 according to an embodiment of the disclosure.

Referring to FIG. 19, the electronic device 1901 in the network environment 1900 may communicate with an electronic device 1902 via a first network 1998 (e.g., a short-range wireless communication network), or at least one of an electronic device 1904 or a server 1908 via a second network 1999 (e.g., a long-range wireless communication network). According to an embodiment, the electronic device 1901 may communicate with the electronic device 1904 via the server 1908. According to an embodiment, the electronic device 1901 may include a processor 1920, memory 1930, an input module (or device) 1950, a sound output module 1955, a display module 1960, an audio module 1970, a sensor module 1976, an interface 1977, a connecting terminal 1978, a haptic module 1979, a camera module 1980, a power management module 1988, a battery 1989, a communication module 1990, a subscriber identification module (SIM) 1996, or an antenna module 1997. In some embodiments, at least one of the components (e.g., the connecting terminal 1978) may be omitted from the electronic device 1901, or one or more other components may be added in the electronic device 1901. In some embodiments, some of the components (e.g., the sensor module 1976, the camera module 1980, or the antenna module 1997) may be implemented as a single component (e.g., the display module 1960).

The processor 1920 may execute, for example, software (e.g., a program 1940) to control at least one other component (e.g., a hardware or software component) of the electronic device 1901 coupled with the processor 1920, and may perform various data processing or computation. According to one embodiment, as at least part of the data processing or computation, the processor 1920 may store a command or data received from another component (e.g., the sensor module 1976 or the communication module 1990) in volatile memory 1932, process the command or the data stored in the volatile memory 1932, and store resulting data in non-volatile memory 1934. According to an embodiment, the processor 1920 may include a main processor 1921 (e.g., a central processing unit (CPU) or an application processor (AP)), or an auxiliary processor 1923 (e.g., a graphics processing unit (GPU), a neural processing unit (NPU), an image signal processor (ISP), a sensor hub processor, or a communication processor (CP)) that is operable independently from, or in conjunction with, the main processor 1921. For example, when the electronic device 1901 includes the main processor 1921 and the auxiliary processor 1923, the auxiliary processor 1923 may be adapted to consume less power than the main processor 1921, or to be specific to a specified function. The auxiliary processor 1923 may be implemented as separate from, or as part of the main processor 1921.

The auxiliary processor 1923 may control at least some of functions or states related to at least one component (e.g., the display module 1960, the sensor module 1976, or the communication module 1990) among the components of the electronic device 1901, instead of the main processor 1921 while the main processor 1921 is in an inactive (e.g., sleep) state, or together with the main processor 1921 while the main processor 1921 is in an active state (e.g., executing an application). According to an embodiment, the auxiliary processor 1923 (e.g., an image signal processor or a communication processor) may be implemented as part of another component (e.g., the camera module 1980 or the communication module 1990) functionally related to the auxiliary processor 1923. According to an embodiment, the auxiliary processor 1923 (e.g., the neural processing unit) may include a hardware structure specified for artificial intelligence model processing. An artificial intelligence model may be generated by machine learning. Such learning may be performed, e.g., by the electronic device 1901 where the artificial intelligence is performed or via a separate server (e.g., the server 1908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1930 may store various data used by at least one component (e.g., the processor 1920 or the sensor module 1976) of the electronic device 1901. The various data may include, for example, software (e.g., the program 1940) and input data or output data for a command related thereto. The memory 1930 may include the volatile memory 1932 or the non-volatile memory 1934.

The program 1940 may be stored in the memory 1930 as software, and may include, for example, an operating system (OS) 1942, middleware 1944, or an application 1946.

The input module 1950 may receive a command or data to be used by another component (e.g., the processor 1920) of the electronic device 1901, from the outside (e.g., a user) of the electronic device 1901. The input module 1950 may include, for example, a microphone, a mouse, a keyboard, a key (e.g., a button), or a digital pen (e.g., a stylus pen).

The sound output module 1955 may output sound signals to the outside of the electronic device 1901. The sound output module 1955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1960 may visually provide information to the outside (e.g., a user) of the electronic device 1901. The display module 1960 may include, for example, a display, a hologram device, or a projector and control circuitry to control a corresponding one of the display, hologram device, and projector. According to an embodiment, the display module 1960 may include a touch sensor adapted to detect a touch, or a pressure sensor adapted to measure the intensity of force incurred by the touch.

The audio module 1970 may convert a sound into an electrical signal and vice versa. According to an embodiment, the audio module 1970 may obtain the sound via the input module 1950, or output the sound via the sound output module 1955 or a headphone of an external electronic device (e.g., an electronic device 1902) directly (e.g., wiredly) or wirelessly coupled with the electronic device 1901.

The sensor module 1976 may detect an operational state (e.g., power or temperature) of the electronic device 1901 or an environmental state (e.g., a state of a user) external to the electronic device 1901, and then generate an electrical signal or data value corresponding to the detected state. According to an embodiment, the sensor module 1976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1977 may support one or more specified protocols to be used for the electronic device 1901 to be coupled with the external electronic device (e.g., the electronic device 1902) directly (e.g., wiredly) or wirelessly. According to an embodiment, the interface 1977 may include, for example, a high definition multimedia interface (HDMI), a universal serial bus (USB) interface, a secure digital (SD) card interface, or an audio interface.

A connecting terminal 1978 may include a connector via which the electronic device 1901 may be physically connected with the external electronic device (e.g., the electronic device 1902). According to an embodiment, the connecting terminal 1978 may include, for example, a HDMI connector, a USB connector, a SD card connector, or an audio connector (e.g., a headphone connector).

The haptic module 1979 may convert an electrical signal into a mechanical stimulus (e.g., a vibration or a movement) or electrical stimulus which may be recognized by a user via his tactile sensation or kinesthetic sensation. According to an embodiment, the haptic module 1979 may include, for example, a motor, a piezoelectric element, or an electric stimulator.

The camera module 1980 may capture a still image or moving images. According to an embodiment, the camera module 1980 may include one or more lenses, image sensors, image signal processors, or flashes.

The power management module 1988 may manage power supplied to the electronic device 1901. According to one embodiment, the power management module 1988 may be implemented as at least part of, for example, a power management integrated circuit (PMIC).

The battery 1989 may supply power to at least one component of the electronic device 1901. According to an embodiment, the battery 1989 may include, for example, a primary cell which is not rechargeable, a secondary cell which is rechargeable, or a fuel cell.

The communication module 1990 may support establishing a direct (e.g., wired) communication channel or a wireless communication channel between the electronic device 1901 and the external electronic device (e.g., the electronic device 1902, the electronic device 1904, or the server 1908) and performing communication via the established communication channel. The communication module 1990 may include one or more communication processors that are operable independently from the processor 1920 (e.g., the application processor (AP)) and supports a direct (e.g., wired) communication or a wireless communication. According to an embodiment, the communication module 1990 may include a wireless communication module 1992 (e.g., a cellular communication module, a short-range wireless communication module, or a global navigation satellite system (GNSS) communication module) or a wired communication module 1994 (e.g., a local area network (LAN) communication module or a power line communication (PLC) module). A corresponding one of these communication modules may communicate with the external electronic device via the first network 1998 (e.g., a short-range communication network, such as Bluetooth™ wireless-fidelity (Wi-Fi) direct, or infrared data association (IrDA)) or the second network 1999 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1992 may identify and authenticate the electronic device 1901 in a communication network, such as the first network 1998 or the second network 1999, using subscriber information (e.g., international mobile subscriber identity (IMSI)) stored in the subscriber identification module 1996.

The wireless communication module 1992 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1992 may support a high-frequency band (e.g., the mmWave band) to achieve, e.g., a high data transmission rate. The wireless communication module 1992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1992 may support various requirements specified in the electronic device 1901, an external electronic device (e.g., the electronic device 1904), or a network system (e.g., the second network 1999). According to an embodiment, the wireless communication module 1992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1997 may transmit or receive a signal or power to or from the outside (e.g., the external electronic device) of the electronic device 1901. According to an embodiment, the antenna module 1997 may include an antenna including a radiating element composed of a conductive material or a conductive pattern formed in or on a substrate (e.g., a printed circuit board (PCB)). According to an embodiment, the antenna module 1997 may include a plurality of antennas (e.g., array antennas). In such a case, at least one antenna appropriate for a communication scheme used in the communication network, such as the first network 1998 or the second network 1999, may be selected, for example, by the communication module 1990 (e.g., the wireless communication module 1992) from the plurality of antennas. The signal or the power may then be transmitted or received between the communication module 1990 and the external electronic device via the selected at least one antenna. According to an embodiment, another component (e.g., a radio frequency integrated circuit (RFIC)) other than the radiating element may be additionally formed as part of the antenna module 1997.

According to various embodiments, the antenna module 1997 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1901 and the external electronic device 1904 via the server 1908 coupled with the second network 1999. Each of the electronic devices 1902 or 1904 may be a device of a same type as, or a different type, from the electronic device 1901. According to an embodiment, all or some of operations to be executed at the electronic device 1901 may be executed at one or more of the external electronic devices 1902, 1904, or 1908. For example, if the electronic device 1901 should perform a function or a service automatically, or in response to a request from a user or another device, the electronic device 1901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1901.

The electronic device 1901 may provide the outcome, with or without further processing of the outcome, as at least part of a reply to the request. To that end, a cloud computing, distributed computing, mobile edge computing (MEC), or client-server computing technology may be used, for example. The electronic device 1901 may provide ultra low-latency services using, e.g., distributed computing or mobile edge computing. In another embodiment, the external electronic device 1904 may include an internet-of-things (IoT) device. The server 1908 may be an intelligent server using machine learning and/or a neural network. According to an embodiment, the external electronic device 1904 or the server 1908 may be included in the second network 1999. The electronic device 1901 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1940) including one or more instructions that are stored in a storage medium (e.g., internal memory 1936 or external memory 1938) that is readable by a machine (e.g., the electronic device 1901). For example, a processor (e.g., the processor 1920) of the machine (e.g., the electronic device 1901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:
1. An electronic device comprising:
a display comprising a sensing area configured to acquire biometric information;
a sensing layer disposed below the display and being configured to sense a touch input or a hovering input, wherein the sensing layer comprises a plurality of openings in an area of the sensing layer corresponding to the sensing area of the display; and a biometric sensor configured to receive light reflected from an external object, wherein the plurality of openings include a first opening and a second opening that are arranged in a first direction, wherein the sensing layer comprises a plurality of signal line sets, that are repeatedly arranged and spaced from each other by a first specified spacing, wherein the plurality of signal line sets include:
- a first signal line set, a second signal line set and a third signal line set that are repeatedly arranged in the first direction, and
- a fourth signal line set, a fifth signal line set and a sixth signal line set that are repeatedly arranged in a second direction intersecting the first direction, wherein each of the first signal line set, the second signal line set and the third signal line set includes a plurality of first signal lines that are repeatedly arranged in the first direction and spaced from each other by a second specified spacing smaller than the first specified spacing, and that are extending in the second direction intersecting the first direction, wherein each of the fourth signal line set, fifth signal line set and the sixth signal line set includes a plurality of second signal lines that are repeatedly arranged in the second direction and spaced from each other by the second specified spacing, and that are extending in the first direction, wherein the first signal line set includes a first bypassing portion extending along edges of the first opening, wherein the second signal line set includes a second bypassing portion extending along edges of the second opening, wherein fourth signal line set includes a third bypassing portion extending along edges of the first opening and a fourth bypassing portion extending along edges of the second opening, wherein a part of the first bypassing portion and a part of the second bypassing portion are arranged between the first opening and the second opening, and wherein a spacing between the part of the first bypassing portion and the part of the second bypassing portion is smaller than the second specified spacing or the first specified spacing.

2. The electronic device of claim 1, further comprising a processor operatively connected to the biometric sensor and the display,
wherein the processor is configured to acquire biometric information based on at least a portion of a light incident on the biometric sensor.

3. The electronic device of claim 1,
wherein the plurality of openings comprises at least one other opening arranged in the second direction,
wherein the first signal line set includes a fifth first bypassing portion extending along edges of the first opening,
wherein the fifth signal line set includes a six bypassing portion extending along edges of the at least one other opening, and
wherein a part of the third bypassing portion and a part of the six bypassing portion are arranged between the first opening and the at least one other opening.

4. The electronic device of claim 2, further comprising an optical member positioned between the sensing layer and the biometric sensor and configured to collect the light that has passed through the plurality of openings of the sensing layer.

5. The electronic device of claim 4, wherein the plurality of openings of the sensing layer and the optical member are arranged such that a path of light passing through the plurality of openings of the sensing layer and the optical member is displaced toward a center of the sensing area.

6. The electronic device of claim 5,
wherein the optical member comprises a plurality of lenses, and
wherein a distance between centers of the plurality of openings of the sensing layer is greater than a distance between centers of the plurality of lens.

7. The electronic device of claim 6,
wherein the biometric sensor comprises a light-receiver to which the light is incident,
wherein the light-receiver comprises a plurality of active areas respectively corresponding to the plurality of openings, and
wherein the processor is further configured to acquire biometric information on areas of the external object spaced from each other respectively using the plurality of active areas of the light-receiver.

8. The electronic device of claim 4, wherein the plurality of openings of the sensing layer and the optical member are arranged such that a path of light passing through the plurality of openings of the sensing layer and the optical member is displaced in a direction radial from a center of the sensing area.

9. The electronic device of claim 8,
wherein the optical member comprises a plurality of lenses, and
wherein a distance between centers of the plurality of openings of the sensing layer is smaller than a distance between centers of the plurality of lens.

10. The electronic device of claim 9,
wherein the biometric sensor comprises a light-receiver to which the light is incident,
wherein the light-receiver comprises a plurality of active areas respectively corresponding to the plurality of openings, and
wherein the processor is further configured to acquire biometric information on a plurality of areas of the external object adjacent to each other respectively using the plurality of active areas of the light-receiver.

11. The electronic device of claim 9, wherein the biometric sensor comprises:
a plurality of light-receivers spaced from each other; and
a sensing circuit disposed between the plurality of light-receivers.

12. The electronic device of claim 2, further comprising a light-blocking layer or a single-layered optical fiber structure oriented at a predefined angle,
wherein the light-blocking layer or the single-layered optical fiber structure is disposed between the sensing layer and the biometric sensor and comprises openings through which the light passing through the plurality of openings of the sensing layer passes.

13. A method for acquiring biometric information using an electronic device, the method comprising:
emitting light from a sensing area of a display toward an external object;
acquiring raw image information on a plurality of areas of the external object, based on light reflected from the external object and passing through a plurality of openings of a sensing layer disposed under the display, and incident on a biometric sensor;

correcting individual portions of the raw image information respectively corresponding to the plurality of areas of the external object; and acquiring biometric information based on the corrected individual portions, wherein the plurality of openings include a first opening and a second opening that are arranged in a first direction, wherein the sensing layer comprises a plurality of signal line sets, that are repeatedly arranged and spaced from each other by a first specified spacing, wherein the plurality of signal line sets include:
a first signal line set, a second signal line set and a third signal line set that are repeatedly arranged in the first direction, and
a fourth signal line set, a fifth signal line set and a sixth signal line set that are repeatedly arranged in a second direction intersecting the first direction, wherein each of the first signal line set, the second signal line set and the third signal line set includes a plurality of first signal lines that are repeatedly arranged in the first direction and spaced from each other by a second specified spacing smaller than the first specified spacing, and that are extending in the second direction intersecting the first direction, wherein each of the fourth signal line set, fifth signal line set and the sixth signal line set includes a plurality of second signal lines that are repeatedly arranged in the second direction and spaced from each other by the second specified spacing, and that are extending in the first direction, wherein the first signal line set includes a first bypassing portion extending along edges of the first opening, wherein the second signal line set includes a second bypassing portion extending along edges of the second opening, wherein fourth signal line set includes a third bypassing portion extending along edges of the first opening and a fourth bypassing portion extending along edges of the second opening, wherein a part of the first bypassing portion and a part of the second bypassing portion are arranged between the first opening and the second opening, and wherein a spacing between the part of the first bypassing portion and the part of the second bypassing portion is smaller than the second specified spacing or the first specified spacing.

14. The method of claim 13,
wherein a light-receiver of the biometric sensor is divided into a plurality of active areas,
wherein the method further comprises separating the raw image information into the individual portions respectively corresponding to the plurality of active areas.

15. The method of claim 14, further comprising deleting a portion acquired using a non-active area of the light-receiver from the raw image information.

16. The method of claim 13, wherein the correcting comprises correcting each of the portions of the raw image information acquired respectively through light-receivers of the biometric sensor spaced from each other.

17. The method of claim 13, further comprising:
comparing the acquired biometric information with a pre-registered image; and
performing a specified function when the acquired biometric information matches the pre-registered image.

* * * * *